(12) United States Patent
Le et al.

(10) Patent No.: US 12,394,100 B2
(45) Date of Patent: Aug. 19, 2025

(54) VIDEO CODING USING CAMERA MOTION COMPENSATION AND OBJECT MOTION COMPENSATION

(71) Applicant: QUALCOMM Incorporated, San Diego, CA (US)

(72) Inventors: Hoang Cong Minh Le, La Jolla, CA (US); Reza Pourreza, San Diego, CA (US); Amir Said, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 468 days.

(21) Appl. No.: 17/862,149

(22) Filed: Jul. 11, 2022

(65) Prior Publication Data

US 2024/0013441 A1 Jan. 11, 2024

(51) Int. Cl.
*G06T 9/00* (2006.01)
*G06T 3/18* (2024.01)
*G06T 3/40* (2024.01)
*G06T 7/246* (2017.01)
*G06T 7/50* (2017.01)

(52) U.S. Cl.
CPC ............... *G06T 9/00* (2013.01); *G06T 3/18* (2024.01); *G06T 3/40* (2013.01); *G06T 7/248* (2017.01); *G06T 7/50* (2017.01); *G06T 2207/20084* (2013.01); *G06T 2207/20224* (2013.01)

(58) Field of Classification Search
CPC .. G06T 9/002; G06T 9/00; G06T 3/18; G06T 3/40; G06T 7/248; G06T 7/50; G06T 2207/20084; G06T 2207/20224
See application file for complete search history.

(56) References Cited

FOREIGN PATENT DOCUMENTS

CN 112954293 A * 6/2021 ........... H04N 13/106

OTHER PUBLICATIONS

Adil Kaan Akan et al., Stochastic Video Prediction with Structure and Motion, arXiv:2203.10528v1, Mar. 20, 2022 (Year: 2022).*
Guo Lu et al. "DVC: An End-to-end Deep Video Compression Framework", 2019 IEEE/CVF Conference on Computer Vision and Pattern Recognition (CVPR), pp. 10998-11007 (Year: 2019).*

(Continued)

*Primary Examiner* — Molly Wilburn
(74) *Attorney, Agent, or Firm* — QUALCOMM Incorporated; Espartaco Diaz Hidalgo

(57) ABSTRACT

Systems and techniques are provided for coding (e.g., encoding and/or decoding) video data using camera motion information. For example, a decoding device can obtain a frame of encoded video data associated with an input frame, the frame of encoded video data including camera information associated with generating the video data and a residual. A camera motion compensated frame can be generated based on a reference frame and the camera information. Optical flow information associated with object motion determined based on at least the input frame and the reference frame can be generated. A motion compensated frame can be generated by warping the camera motion compensated frame based on the optical flow information. A reconstructed input frame can be generated based on the motion compensated frame and the residual.

30 Claims, 13 Drawing Sheets

(56) References Cited

OTHER PUBLICATIONS

Akan A.K., et al., "Stochastic Video Prediction with Structure and Motion", arxiv.org, Cornell University Library, 201 Olin Library Cornell University Ithaca, NY 14853, V2, Apr. 29, 2022, pp. 1-26, XP091198128, Paragraph [03.3].

Akan A.K., et al.,"Stochastic Video Prediction with Structure and Motion", arxiv.org, Cornell University Library, 201 Olin Library Cornell University Ithaca, NY 14853, Mar. 20, 2022, V1, XP091181602, 27 Pages, p. 3, Paragraph 3.2-p. 4, Paragraph 3.3, Figure 2 p. 5, Paragraph 3.5-Paragraph 4.

Chen X., et al., "NVS Machines: Learning Novel View Synthesis with Fine-grained View Control", arxiv.org, Cornell University Library, 201 Olin Library Cornell University Ithaca, NY 14853, Jan. 7, 2019, XP081012100, pp. 1-10, p. 3, Paragraph 3.1-p. 5, Paragraph [0003], Paragraph [0004], Figures 2,3.

International Search Report and Written Opinion—PCT/US2023/069789—ISA/EPO—Oct. 25, 2023.

\* cited by examiner

1100

OBTAIN A FRAME OF ENCODED VIDEO DATA ASSOCIATED WITH AN INPUT FRAME, THE FRAME OF ENCODED VIDEO DATA INCLUDING CAMERA INFORMATION ASSOCIATED WITH GENERATING THE VIDEO DATA AND A RESIDUAL
1102

GENERATE A CAMERA MOTION COMPENSATED FRAME BASED ON A REFERENCE FRAME AND THE CAMERA INFORMATION
1104

GENERATE AN OPTICAL FLOW ASSOCIATED WITH AN OBJECT MOTION DETERMINED BASED ON AT LEAST THE INPUT FRAME AND THE REFERENCE FRAME
1106

GENERATE A MOTION COMPENSATED FRAME BY WARPING THE CAMERA MOTION COMPENSATED FRAME BASED ON THE OPTICAL FLOW
1108

GENERATE, BASED ON MOTION COMPENSATED FRAME AND THE RESIDUAL, A RECONSTRUCTED INPUT FRAME
1110

FIG. 11

VIDEO CODING USING CAMERA MOTION COMPENSATION AND OBJECT MOTION COMPENSATION

FIELD

The present disclosure generally relates to video coding (e.g., encoding and/or decoding video data). For example, aspects of the present disclosure are related to systems and techniques for performing camera motion compensation and object motion compensation for video coding.

BACKGROUND

Many devices and systems allow video data to be processed and output for consumption. Digital video data includes large amounts of data to meet increasing demands in video quality, performance, and features. For example, consumers of video data typically desire high quality videos, with high fidelity, resolutions, frame rates, and the like. As a result, the large amount of video data often needed to meet these demands places a burden on communication networks and devices that process and store the video data.

Video coding techniques may be used to compress video data. One example goal of video coding is to compress video data into a form that uses a lower bit rate, while avoiding or minimizing degradations in video quality. With ever-evolving video services becoming available and the increasing demands in large amounts of video data, coding techniques with better performance and efficiency are needed.

SUMMARY

In some examples, systems and techniques are described for coding (e.g., encoding and/or decoding) video data using a machine learning architecture. For example, the systems and techniques can use one or more machine learning networks (e.g., neural networks) to perform video coding for rendered video data and/or other video data, based on depth information and/or camera pose information associated with the rendered video data. According to at least one illustrative example, an apparatus for decoding video data is provided that includes at least one memory (e.g., configured to store data, such as virtual content data, one or more images, etc.) and one or more processors (e.g., implemented in circuitry) coupled to the at least one memory. The one or more processors are configured to and can: obtain a frame of encoded video data associated with an input frame, the frame of encoded video data including camera information associated with generating the video data and a residual; generate a camera motion compensated frame based on a reference frame and the camera information; generate optical flow information associated with object motion determined based on at least the input frame and the reference frame; generate a motion compensated frame by warping the camera motion compensated frame based on the optical flow information; and generate, based on the motion compensated frame and the residual, a reconstructed input frame.

In another example, a method for decoding video data is provided, the method including: obtaining a frame of encoded video data associated with an input frame, the frame of encoded video data including camera information associated with generating the video data and a residual; generating a camera motion compensated frame based on a reference frame and the camera information; generating optical flow information associated with object motion determined based on at least the input frame and the reference frame; generating a motion compensated frame by warping the camera motion compensated frame based on the optical flow information; and generating, based on the motion compensated frame and the residual, a reconstructed input frame.

In another example, a non-transitory computer-readable medium is provided that has stored thereon instructions that, when executed by one or more processors, cause the one or more processors to: obtain a frame of encoded video data associated with an input frame, the frame of encoded video data including camera information associated with generating the video data and a residual; generate a camera motion compensated frame based on a reference frame and the camera information; generate optical flow information associated with object motion determined based on at least the input frame and the reference frame; generate a motion compensated frame by warping the camera motion compensated frame based on the optical flow information; and generate, based on the motion compensated frame and the residual, a reconstructed input frame.

In another example, an apparatus for decoding video data is provided. The apparatus includes: means for obtaining a frame of encoded video data associated with an input frame, the frame of encoded video data including camera information associated with generating the video data and a residual; means for generating a camera motion compensated frame based on a reference frame and the camera information; means for generating optical flow information associated with object motion determined based on at least the input frame and the reference frame; means for generating a motion compensated frame by warping the camera motion compensated frame based on the optical flow information; and means for generating, based on the motion compensated frame and the residual, a reconstructed input frame.

In another example, an apparatus for encoding video data is provided that includes at least one memory (e.g., configured to store data, such as virtual content data, one or more images, etc.) and one or more processors (e.g., implemented in circuitry) coupled to the at least one memory. The one or more processors are configured to and can: obtain an input frame of video data and camera information associated with generating the input frame of video data; generate a camera motion compensated frame based on a reference frame and the camera information; generate optical flow information associated with object motion determined based on at least the input frame and the reference frame; generate a motion compensated frame by warping the camera motion compensated frame based on the optical flow information; determine, based on a difference between the input frame and a reconstructed input frame generated using the motion compensated frame, a residual; and generate a frame of encoded video data associated with the input frame of video data, the frame of encoded video data including the camera information and the residual.

In another example, a method for encoding video data is provided, the method including: obtaining an input frame of video data and camera information associated with generating the input frame of video data; generating a camera motion compensated frame based on a reference frame and the camera information; generating optical flow information associated with object motion determined based on at least the input frame and the reference frame; generating a motion compensated frame by warping the camera motion compensated frame based on the optical flow information; determining, based on a difference between the input frame and a reconstructed input frame generated using the motion compensated frame, a residual; and generating a frame of encoded video data associated with the input frame of video data, the frame of encoded video data including the camera information and the residual.

In another example, a non-transitory computer-readable medium is provided that has stored thereon instructions that, when executed by one or more processors, cause the one or more processors to: obtain an input frame of video data and camera information associated with generating the input frame of video data; generate a camera motion compensated frame based on a reference frame and the camera information; generate optical flow information associated with object motion determined based on at least the input frame and the reference frame; generate a motion compensated frame by warping the camera motion compensated frame based on the optical flow information; determine, based on a difference between the input frame and a reconstructed input frame generated using the motion compensated frame, a residual; and generate a frame of encoded video data associated with the input frame of video data, the frame of encoded video data including the camera information and the residual.

In another example, an apparatus for encoding video data is provided. The apparatus includes: means for obtaining an input frame of video data and camera information associated with generating the input frame of video data; means for generating a camera motion compensated frame based on a reference frame and the camera information; means for generating optical flow information associated with object motion determined based on at least the input frame and the reference frame; means for generating a motion compensated frame by warping the camera motion compensated frame based on the optical flow information; means for determining, based on a difference between the input frame and a reconstructed input frame generated using the motion compensated frame, a residual; and means for generating a frame of encoded video data associated with the input frame of video data, the frame of encoded video data including the camera information and the residual.

In some aspects, the apparatus can include or be part of a mobile device, a wearable device, an extended reality device (e.g., a virtual reality (VR) device, an augmented reality (AR) device, or a mixed reality (MR) device), a personal computer, a laptop computer, a server computer, a television, a video game console, or other device. In some aspects, the apparatus comprises a mobile device (e.g., a mobile telephone or so-called "smart phone"). In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit the reconstructed video frame over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 11 is a flowchart illustrating an example of a process for processing video data, in accordance with some examples.

DETAILED DESCRIPTION

Figure 1:
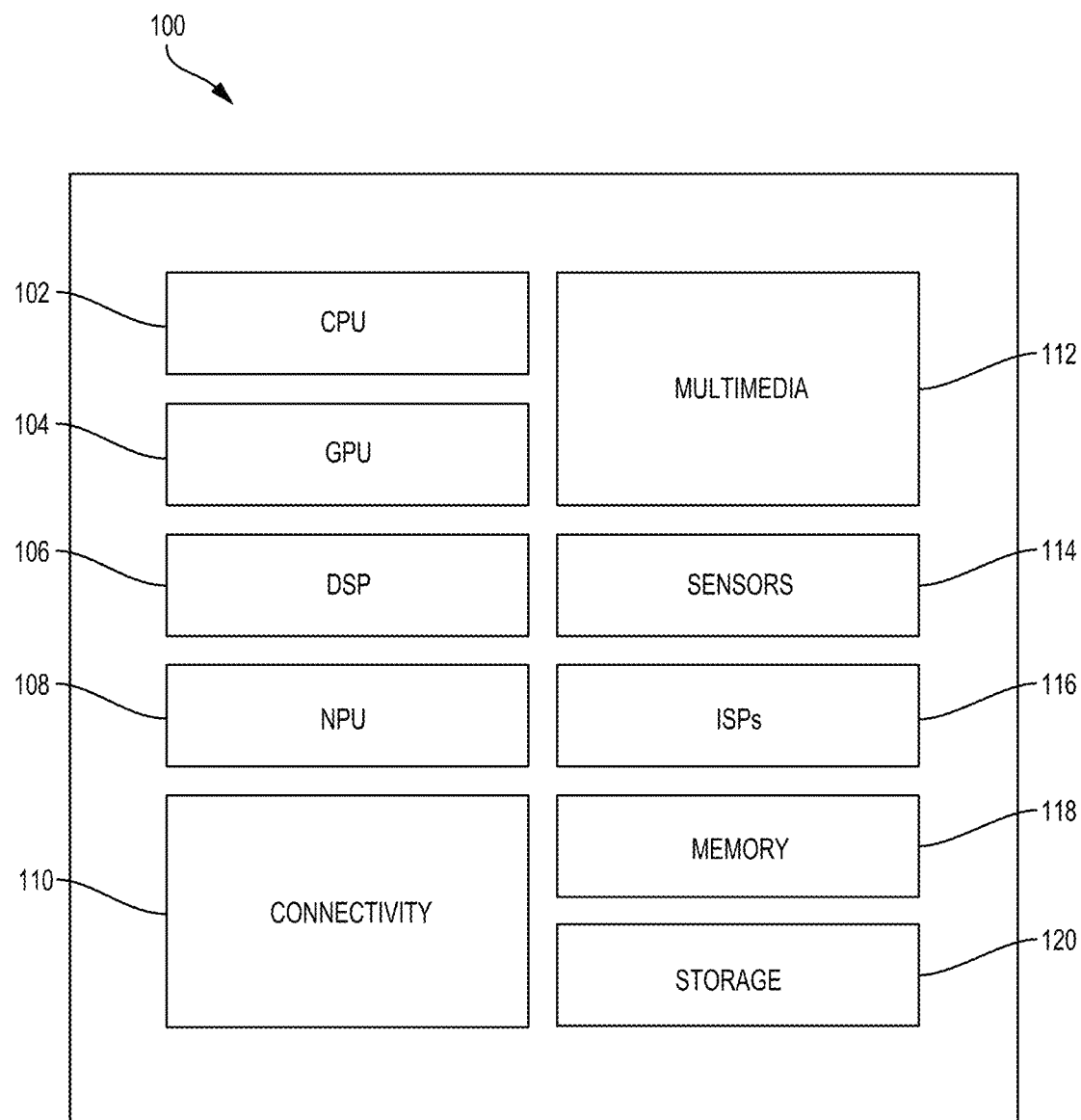
FIG. 1 illustrates an example image processing system which can implement the various techniques described herein, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims Digital video data can include large amounts of data, particularly as the demand for high quality video data continues to grow. For example, consumers of video data typically desire video of increasingly high quality, with high fidelity, resolution, frame rates, and the like. However, the large amount of video data often needed to meet such demands can place a significant burden on communication networks as well devices that process and store the video data.

Various techniques can be used to code video data. In some cases, video coding can be performed according to a particular video coding standard and/or scheme. Example video coding standards include high-efficiency video coding (HEVC), advanced video coding (AVC), moving picture experts group (MPEG) coding, versatile video coding (VVC), among others. One goal of video coding techniques is to compress video data into a form that uses a lower bit rate, while avoiding or minimizing degradations in the video quality. As the demand for video services grows and new video services become available, coding techniques with better efficiency and performance are needed.

Video coding can use prediction methods such as intra-prediction or inter-prediction, which take advantage of redundancies present in video frames or other sequences of images or frames. Intra-prediction is performed using the data within a single frame of video, and is based on the spatial characteristics of the frame. Frames coded using intra-prediction are referred to as I-frames. Inter-prediction of a frame is performed based on temporal characteristics of the frame relative to other frames. For example, inter-prediction of a video frame can be performed by identifying regions of other video frames that include changes relative to the video frame and regions that include redundancies relative to the video frame (e.g., background regions that remain largely unchanged). The redundancies can be removed, resulting in a residual for the video frame. The residual can be further encoded (e.g., using entropy coding), and the result can be included in a bitstream that is stored, transmitted, or otherwise output.

Examples of inter-prediction include unidirectional prediction (uni-prediction) and bidirectional prediction (bi-prediction). Uni-prediction includes the use of a single reference frame when performing inter-prediction of a frame. Frames coded using uni-prediction are referred to as predicted frames (P-frames). Bi-prediction involves the use of two reference frames when performing inter-prediction of a frame. Frames coded using bi-prediction are referred to as bi-predicted frames (B-frames).

In some cases, machine learning systems can be used to perform video encoding (compression) and decoding (decompression). In general, machine learning (ML) is a subset of artificial intelligence (AI). ML systems include algorithms and statistical models that computer systems can use to perform various tasks by relying on patterns and inference. One example of a ML system is a neural network (also referred to as an artificial neural network), which can include an interconnected group of artificial neurons (e.g., neuron models). Neural networks may be used for various applications and/or devices, such as image analysis and/or computer vision applications, Internet Protocol (IP) cameras, Internet of Things (IoT) devices, autonomous vehicles, service robots, among others.

Individual nodes in the neural network may emulate biological neurons by taking input data and performing operations on the data. The results of the operations performed on the input data are selectively passed to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network. For instance, weight values may be established during a training phase in which the network learns how to identify particular classes by their typical input data characteristics. In one example, the network may be trained to learn a particular task by adapting values of parameters associated with the neurons (e.g., activation parameters and/or weights, biases, etc.), adding and/or removing neurons or even layers of neurons, adding or removing edges between neurons, etc.

Different types of neural networks exist, such as autoencoders, convolutional neural networks (CNNs), recurrent neural networks (RNNs), multilayer perceptron (MLP) neural networks, among others. Convolutional neural networks may include collections of artificial neurons that each have a receptive field (e.g., a spatially localized region of an input space) and that collectively tile an input space. Convolutional neural networks have numerous applications. For example, CNNs can be broadly used in the area of pattern recognition and classification. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, machine learning based P-frame and B-frame coding systems can be used to perform uni-prediction and bi-prediction, respectively. In some cases, such systems can include neural network architectures (e.g., one or more deep neural networks, such as one or more autoencoders). An example of a machine learning based P-frame coding system can perform motion compression and motion compensation on a current frame and a reference frame to determine a prediction of motion between the current frame and the reference frame. The motion prediction can be used to modify the pixels of the reference frame (e.g., by moving the pixels of the reference frame according to motion vectors included in the motion prediction), resulting in a prediction for the current frame. A residual portion of the P-frame coding system can generate a predicted residual representing a difference between the prediction and the current frame. The predicted residual can be combined with the prediction to generate a reconstructed current frame.

Systems, methods (also referred to as processes), apparatuses, and computer-readable media (collectively referred to as "systems and techniques") are described herein for performing coding of video data based on using rendering information and/or additional information associated with the video data to perform camera motion compensation and object motion compensation. As used herein, the term coding can refer to encoding (e.g., compression), decoding (e.g., decompression), or both encoding and decoding. For example, the systems and techniques described herein can perform video coding for frames of video content (e.g., frames of rendered and/or gaming content) based on using separate motion prediction systems to perform camera motion compensation and to perform object motion compensation. In some cases, the systems and techniques can perform camera motion compensation based on rendering information associated with one or more frames of the video content.

In some aspects, rendering information associated with one or more frames of the currently encoded and/or decoded video content can include a current camera pose $p_t$ (e.g., the camera pose associated with the current frame t), a reference camera pose $p_{t-1}$ (e.g., the camera pose associated with the prior frame t−1), and a depth map $D_t$ associated with the current frame t. In some cases, camera pose information can include position and orientation information of a camera with respect to a reference coordinate system of the scene depicted in the video content (e.g., the scene captured by the camera). A depth map can be an image that includes information associated with the distance of the surfaces of scene objects from a given viewpoint (e.g., the viewpoint of the camera that captures the scene). In some examples, a depth map can have the same pixel dimensions as a corresponding frame of video data for which the depth map is generated, wherein some (or all) of the pixels included in the depth map are associated with a depth value. The depth value associated with a given pixel can indicate a distance from the camera viewpoint to the surface of the scene object depicted by the given pixel.

In examples in which the frames of encoded and/or decoded video content are frames of rendered video data, the camera pose information and depth information may be generated in association with rendering the video frames (e.g., generated at the time the video frame is originally generated, prior to encoding or decoding). For example, camera pose and depth information can be obtained from one or more rendering engines associated with generating the rendered frames, based on the rendering engines having used the camera pose and depth information to originally generate the rendered frames. In some aspects, camera pose and depth information associated with frames of rendered gaming content can be obtained from one or more buffers associated with a rendering or game engine used to generate the gaming content. For example, camera pose and depth information associated with frames of rendered gaming content generated by a game engine and/or a cloud gaming server of can be obtained from a deferred rendering buffer and/or geometry buffer (G-buffer) associated with the game engine. In some examples, the camera pose and depth information may be stored in a deferred rendering buffer or G-buffer among various other types of rendering information (e.g., motion information, optical flow maps, normal maps, albedo maps, etc.).

In some examples, the systems and techniques described herein can be used to perform video coding based on separate camera motion compensation and object motion compensation for non-rendered video content (e.g., natural video content). For example, the camera pose information $p_t$ and $p_{t-1}$ can be obtained from a camera used to captured the non-rendered or natural video content, can be determined using one or more post-processing algorithms or machine-learning networks, etc. In some cases, depth information can be obtained from a camera that includes one or more depth sensors and captures depth information and video content simultaneously (e.g., such that the video content is captured in combination with a corresponding depth map for one or more frames of the captured video content). In some aspects, depth information can be obtained from a stereo camera that includes two or more cameras for determining depth maps.

In some examples, a depth map prediction system and a three-dimensional (3D) warping engine can be used to generate an initial frame prediction $\overline{X}_t$ that is compensated using camera motion determined based on the input camera pose $p_t$, reference camera pose $p_{t-1}$, and depth map $D_t$. In some cases, the initial frame prediction $\overline{X}_t$ may also be referred to as a camera motion compensated frame. A 3D warping engine can generate the initial frame prediction $\overline{X}_t$ based on receiving as input the camera pose $p_t$ for the current frame t, the reference camera pose $p_{t-1}$ for the previous frame t−1, the previously decoded (e.g. reconstructed) frame $\hat{X}_{t-1}$, and a predicted (e.g., reconstructed) depth map $\hat{d}_t$ for the current frame t. The camera poses $p_t$ and $p_{t-1}$, along with the depth map $D_t$ can be generated by a rendering engine (e.g., a cloud gaming engine) associated with a neural video encoder. In some examples, the neural video encoder can be included in a same server or other computing device as the rendering engine used to generate the frames of rendered video data being encoded (e.g., which may also be the same rendering engine used to generate the camera poses $p_t$ and $p_{t-1}$, along with the depth map $D_t$).

Further aspects of the systems and techniques will be described with respect to the figures. FIG. 1 illustrates an example implementation of an image processing system 100 that, in some cases, can be used to implement the systems and techniques described herein. The image processing system 100 can include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, image data, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 and/or from a memory block 118.

The image processing system 100 can also include additional processing blocks for performing specific functions, such as a GPU 104; a DSP 106; a connectivity block 110, which may include fifth generation (5G) connectivity, fourth generation long term evolution (4G LTE) connectivity, Wi-Fi connectivity, USB connectivity, Bluetooth connectivity, and the like; and/or a multimedia processor 112 that may, for example, detect image features. In some examples, the NPU 108 can be implemented in the CPU 102, DSP 106, and/or GPU 104. In some cases, the image processing system 100 may also include one or more sensor 114, one or more image signal processors (ISPs) 116, and/or storage 120.

In some examples, the image processing system 100 can implement an ARM instruction set architecture for one or more processors. In an aspect of the present disclosure, the instructions loaded into the CPU 102 may include code to search for a stored multiplication result in a lookup table (LUT) corresponding to a multiplication product of an input value and a filter weight. The instructions loaded into the CPU 102 may also include code to disable a multiplier during a multiplication operation of the multiplication product when a lookup table hit of the multiplication product is detected. In addition, the instructions loaded into the CPU 102 may include code to store a computed multiplication product of the input value and the filter weight when a lookup table miss of the multiplication product is detected.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

The image processing system 100 and/or components thereof may be configured to perform video compression and/or decompression (also referred to as video encoding and/or decoding, collectively referred to as video coding) using techniques according to aspects of the present disclosure discussed herein. By using deep learning architectures and the techniques described herein to perform video compression and/or decompression, aspects of the present disclosure can increase the efficiency of video compression and/or decompression on a device and/or reduce associated resource requirements and/or usage. For example, a device using the video coding techniques described herein can compress video data more efficiently, can reduce the amount of data transmitted in compressed video data to a destination device, and the destination device can receive and decompress the compressed video data efficiently. In some examples, the deep learning architectures and techniques described herein can reduce the amount of data exchanged between coding devices or components, such as encoders and decoders, to code video content. The reduced amount of data transmitted for video coding can reduce latencies, increase performance, and reduce the cost or burden on computing resources such as, for example, bandwidth, memory, storage, power, compute, hardware, etc.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize features, such as edges, in the input stream. In another example, if presented with auditory data, the first layer may learn to recognize spectral power in specific frequencies. The second layer, taking the output of the first layer as input, may learn to recognize features, such as shapes for visual data or combinations of sounds for auditory data. For instance, higher layers may learn to represent complex shapes in visual data or words in auditory data. Still higher layers may learn to recognize common visual objects and/or spoken phrases.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
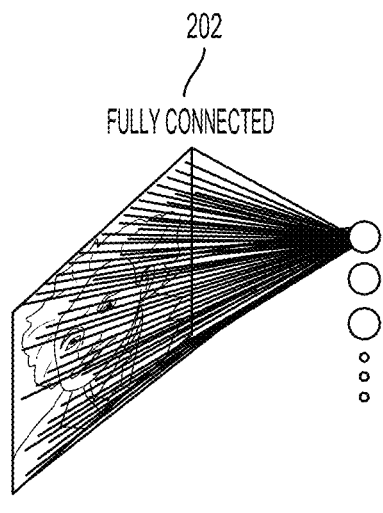
FIG. 2A illustrates an example of a fully connected neural network, in accordance with some examples.
Figure 2B:
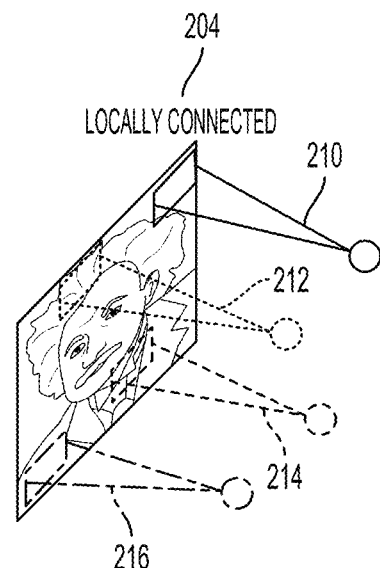
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
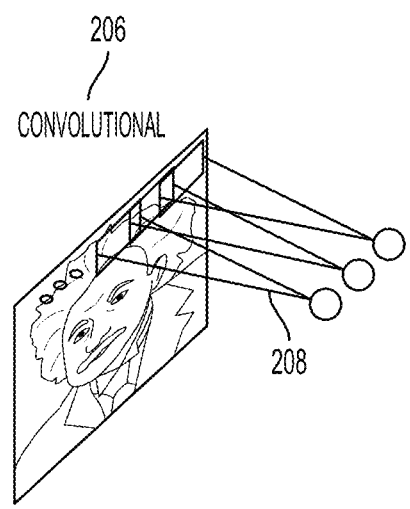
FIG. 2C illustrates an example of a convolutional neural network, in accordance with some examples.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
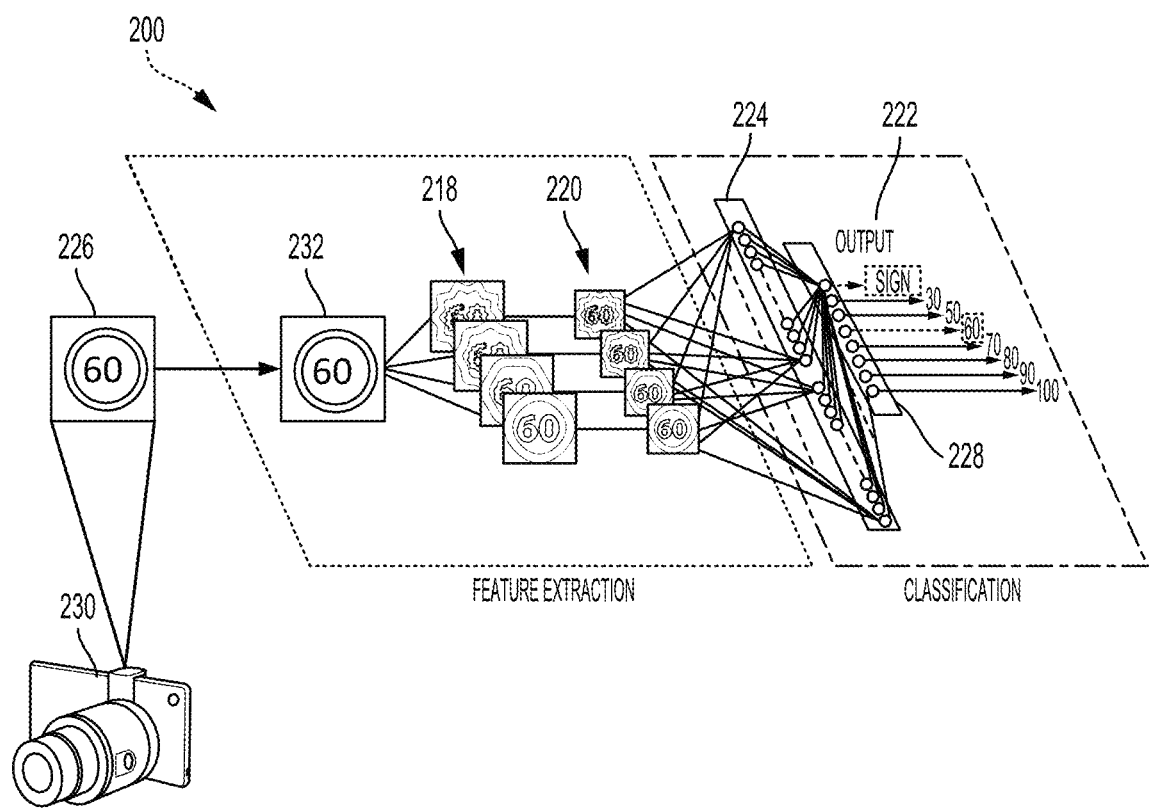
FIG. 2D illustrates a detailed example of a deep convolutional network (DCN) designed to recognize features from an image, in accordance with some examples.

One type of convolutional neural network is a deep convolutional network (DCN). FIG. 2D illustrates an example of a DCN 200 designed to recognize features from an image 226 input from an image capturing device 230, such as a camera or image sensor. In some examples, the DCN 200 of the current example may be trained to identify visual features in the image 226, such as one or more objects or signs in the image 226, for example.

In some examples, the DCN 200 may be trained with supervised learning. During training, the DCN 200 may be presented with an image, such as the image 226, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign", "60", and "100". A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30", "40", "50", "70", "80", "90", and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs can achieve high performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less than, for example, that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
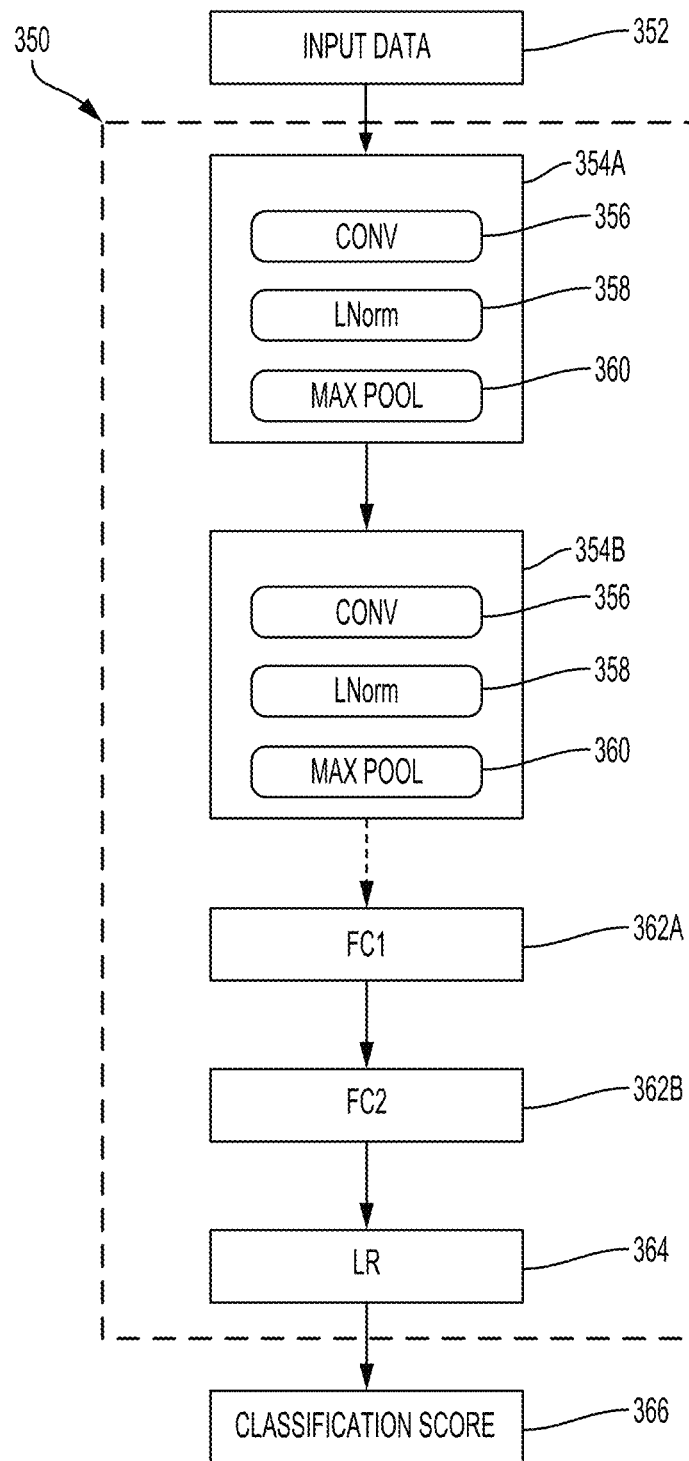
FIG. 3 is a block diagram illustrating another example DCN, in accordance with some examples.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preferences. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an image processing system 100 to achieve high performance and low power consumption. In some examples, the parallel filter banks may be loaded on the DSP 106 or an ISP 116 of an image processing system 100. The deep convolutional network 350 may access other processing blocks that may be present on the image processing system 100.

The deep convolutional network 350 may include one or more fully connected layers, such as layer 362A (labeled "FC1") and layer 362B (labeled "FC2"). The deep convolutional network 350 may include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Another type of neural network is an autoencoder. An autoencoder can be trained (e.g., using training data and one or more loss functions) to receive input and to generate a version of that input at its output (e.g., to essentially copy its input to its output). An autoencoder can be trained to learn efficient data codings in an unsupervised manner. For example, given an image of an object, an autoencoder can first encode the image into a lower dimensional latent representation, and can then decode the latent representation back to an image of the object. An autoencoder can learn (through training) to compress the input data while minimizing the reconstruction error.

As noted previously, digital video data can include large amounts of data, which can place a significant burden on communication networks and devices that process and store the video data. For instance, recording uncompressed video content generally results in large file sizes that greatly increase as the resolution of the recorded video content increases. In one illustrative example, uncompressed 16-bit per channel video recorded in 1080 p/24 (e.g., a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Network bandwidth is another constraint for which large video files can become problematic. For example, video content is oftentimes delivered over wireless networks (e.g., via LTE, LTE-Advanced, New Radio (NR), WiFi™, Bluetooth™, or other wireless networks), and can make up a large portion of consumer internet traffic. Thus, it is desirable to reduce the amount of bandwidth used to deliver video content in these networks.

Because uncompressed video content can result in large files that may involve sizable memory for physical storage and considerable bandwidth for transmission, video coding techniques can be utilized to compress and decompress such video content, as further described herein.

To reduce the size of video content—and thus the amount of storage involved to store video content and the amount of bandwidth involved in delivering video content-various video coding techniques can be performed according to a particular video coding standard and/or scheme, such as HEVC, AVC, MPEG, VVC, among others. Video coding can use prediction methods such as inter-prediction or intra-prediction, which take advantage of redundancies present in video images or sequences. One goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

An encoding device can encode video data according to a video coding standard to generate an encoded video bitstream. In some examples, an encoded video bitstream (or "video bitstream" or "bitstream") can include a series of one or more coded video sequences. The encoding device can generate coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

According to the HEVC standard, transformations may be performed using TUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoding device.

Once the pictures of the video data are partitioned into CUs, the encoding device predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types can include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (unidirectional predicted frames) is a slice of a picture that may be coded with intra-prediction and with unidirectional inter-prediction. Each prediction unit or prediction block within a P slice is either coded with intra-prediction or inter-prediction. When inter-prediction applies, the prediction unit or prediction block is predicted by one reference picture, and therefore reference samples are from one reference region of one frame. A B slice (bidirectional predictive frames) is a slice of a picture that may be coded with intra-prediction and inter-prediction (e.g., either bi-prediction or uni-prediction). A prediction unit or prediction block of a B slice may be bidirectionally-predicted from two reference pictures. Each picture can contribute a reference region and sample sets of the two reference regions can be weighted (e.g., with equal weights or with different weights) to produce the prediction signal of the bidirectionally-predicted block. As explained above, slices of one picture are independently coded. In some cases, a picture can be coded as just one slice.

After performing prediction using intra- and/or inter-prediction, the encoding device can perform transformation and quantization. For example, following prediction, the encoding device may calculate residual values corresponding to the PU. Residual values may include pixel difference values between the current block of pixels being coded (the PU) and the prediction block used to predict the current block (e.g., the predicted version of the current block). For example, after generating a prediction block (e.g., using inter-prediction or intra-prediction), the encoding device can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some aspects, a TU may be used for the transform and quantization processes implemented by the encoding device. A given CU having one or more PUs may also include one or more TUs. As described in further detail below, the residual values may be transformed into transform coefficients using the block transforms, and then may be quantized and scanned using TUs to produce serialized transform coefficients for entropy coding.

The encoding device may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoding device. In some examples, the encoding device may utilize a predefined scan order to scan the quantized transform coefficients to produce a serialized vector that can be entropy encoded. In some examples, encoding device may perform an adaptive scan. After scanning the quantized transform coefficients to form a vector (e.g., a one-dimensional vector), the encoding device may entropy encode the vector. For example, the encoding device may use context adaptive variable length coding, context adaptive binary arithmetic coding, syntax-based context-adaptive binary arithmetic coding, probability interval partitioning entropy coding, or another suitable entropy encoding technique.

The encoding device can store the encoded video bitstream and/or can send the encoded video bitstream data over a communications link to a receiving device, which can include a decoding device. The decoding device may decode the encoded video bitstream data by entropy decoding (e.g., using an entropy decoder) and extracting the elements of one or more coded video sequences making up the encoded video data. The decoding device may then rescale and perform an inverse transform on the encoded video bitstream data. Residual data is then passed to a prediction stage of the decoding device. The decoding device then predicts a block of pixels (e.g., a PU) using intra-prediction, inter-prediction, IBC, and/or other type of prediction. In some examples, the prediction is added to the output of the inverse transform (the residual data). The decoding device may output the decoded video to a video destination device, which may include a display or other output device for displaying the decoded video data to a consumer of the content.

Video coding systems and techniques defined by the various video coding standards (e.g., the HEVC video coding techniques described above) may be able to retain much of the information in raw video content and may be defined a priori based on signal processing and information theory concepts. However, in some cases, a machine learning (ML)-based image and/or video system can provide benefits over non-ML based image and video coding systems, such as an end-to-end neural network-based image and video coding (E2E-NNVC) system. As described above, many E2E-NNVC systems are designed as combination of an autoencoder sub-network (the encoder sub-network) and a second sub-network responsible for learning a probabilistic model over quantized latents used for entropy coding. Such an architecture can be viewed as a combination of a transform plus quantization module (encoder sub-network) and the entropy modelling sub-network module.

Figure 4:
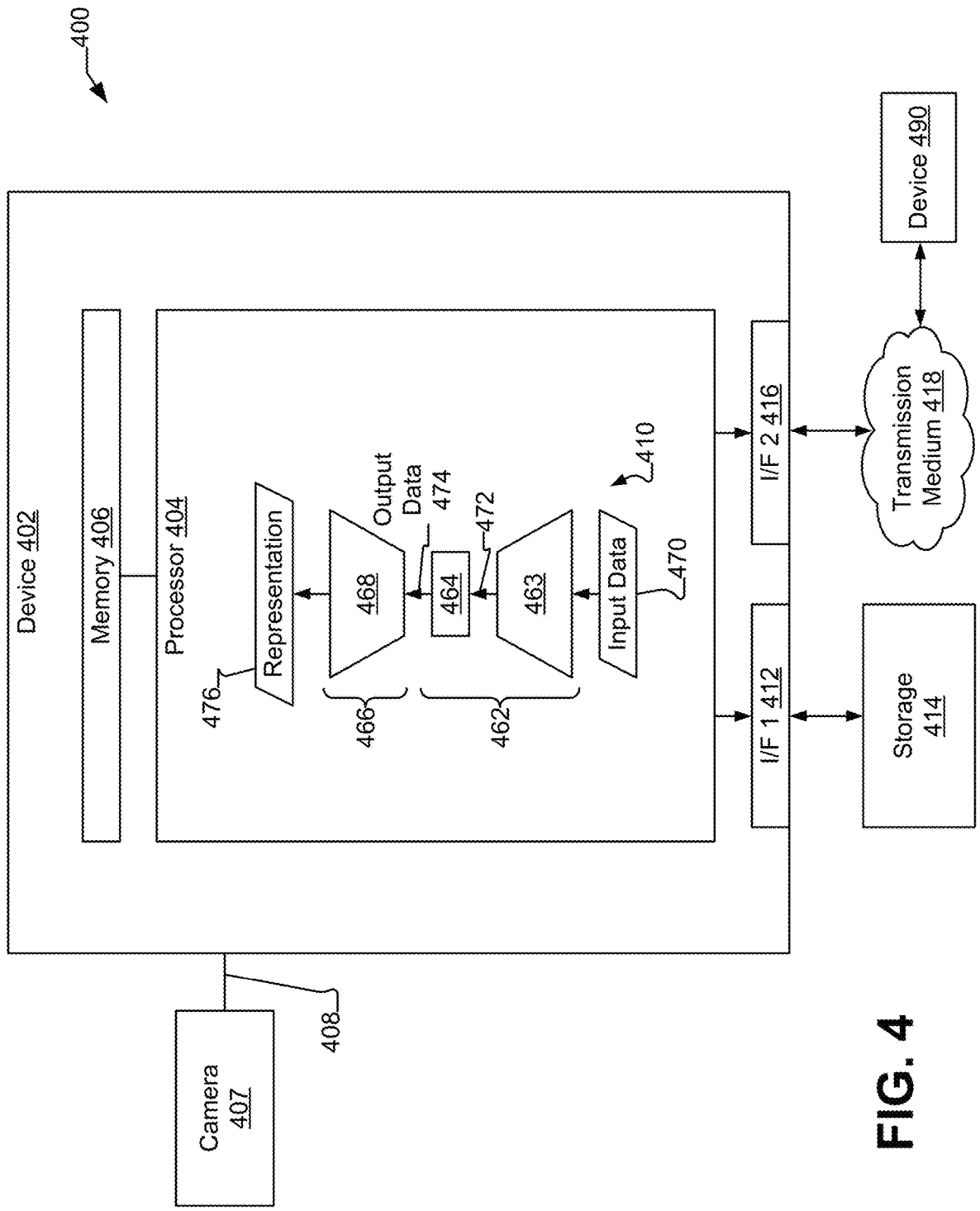
FIG. 4 is a diagram illustrating an example of a system including a device operable to perform image and/or video coding (e.g., encoding and decoding) using a neural network-based system, in accordance with some examples.

FIG. 4 depicts a system 400 that includes a device 402 configured to perform image and/or video encoding and decoding using an E2E-NNVC system 410. The device 402 is coupled to a camera 407 and a storage medium 414 (e.g., a data storage device). In some implementations, the camera 407 is configured to provide the image data 408 (e.g., a video data stream) to the processor 404 for encoding by the E2E-NNVC system 410. In some implementations, the device 402 can be coupled to and/or can include multiple cameras (e.g., a dual-camera system, three cameras, or other number of cameras). In some cases, the device 402 can be coupled to a microphone and/or other input device (e.g., a keyboard, a mouse, a touch input device such as a touchscreen and/or touchpad, and/or other input device). In some examples, the camera 407, the storage medium 414, microphone, and/or other input device can be part of the device 402.

The device 402 is also coupled to a second device 490 via a transmission medium 418, such as one or more wireless networks, one or more wired networks, or a combination thereof. For example, the transmission medium 418 can include a channel provided by a wireless network, a wired network, or a combination of a wired and wireless network. The transmission medium 418 may form part of a packet-based network, such as a local area network, a wide-area network, or a global network such as the Internet. The transmission medium 418 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

The device 402 includes one or more processors (referred to herein as "processor") 404 coupled to a memory 406, a first interface ("I/F 1") 412, and a second interface ("I/F 2") 416. The processor 404 is configured to receive image data 408 from the camera 407, from the memory 406, and/or from the storage medium 414. The processor 404 is coupled to the storage medium 414 via the first interface 412 (e.g., via a memory bus) and is coupled to the transmission medium 418 via the second interface 416 (e.g., a network interface device, a wireless transceiver and antenna, one or more other network interface devices, or a combination thereof).

The processor 404 includes the E2E-NNVC system 410. The E2E-NNVC system 410 includes an encoder portion 462 and a decoder portion 466. In some implementations, the E2E-NNVC system 410 can include one or more autoencoders. The encoder portion 462 is configured to receive input data 470 and to process the input data 470 to generate output data 474 at least partially based on the input data 470.

In some implementations, the encoder portion 462 of the E2E-NNVC system 410 is configured to perform lossy compression of the input data 470 to generate the output data 474, so that the output data 474 has fewer bits than the input data 470. The encoder portion 462 can be trained to compress input data 470 (e.g., images or video frames) without using motion compensation based on any previous representations (e.g., one or more previously reconstructed frames). For example, the encoder portion 462 can compress a video frame using video data only from that video frame, and without using any data of previously reconstructed frames. Video frames processed by the encoder portion 462 can be referred to herein as intra-predicted frame (I-frames). In some examples, I-frames can be generated using traditional video coding techniques (e.g., according to HEVC, VVC, MPEG-4, or other video coding Standard). In such examples, the processor 404 may include or be coupled with a video coding device (e.g., an encoding device) configured to perform block-based intra-prediction, such as that described above with respect to the HEVC Standard. In such examples, the E2E-NNVC system 410 may be excluded from the processor 404.

In some implementations, the encoder portion 462 of the E2E-NNVC system 410 can be trained to compress input data 470 (e.g., video frames) using motion compensation based on previous representations (e.g., one or more previously reconstructed frames). For example, the encoder portion 462 can compress a video frame using video data from that video frame and using data of previously reconstructed frames. Video frames processed by the encoder portion 462 can be referred to herein as intra-predicted frame (P-frames). The motion compensation can be used to determine the data of a current frame by describing how the pixels from a previously reconstructed frame move into new positions in the current frame along with residual information.

As shown, the encoder portion 462 of the E2E-NNVC system 410 can include a neural network 463 and a quantizer 464. The neural network 463 can include one or more transformers, one or more convolutional neural networks (CNNs), one or more fully connected neural networks, one or more gated recurrent units (GRUs), one or more Long Short-Term Memory (LSTM) networks, one or more ConvRNNs, one or more ConvGRUs, one or more ConvLSTMs, one or more GANs, any combination thereof, and/or other types of neural network architectures that generate(s) intermediate data 472. The intermediate data 472 is input to the quantizer 464.

The quantizer 464 is configured to perform quantization and in some cases entropy coding of the intermediate data 472 to produce the output data 474. The output data 474 can include the quantized (and in some cases entropy coded) data. The quantization operations performed by the quantizer 464 can result in the generation of quantized codes (or data representing quantized codes generated by the E2E-NNVC system 410) from the intermediate data 472. The quantization codes (or data representing the quantized codes) can also be referred to as latent codes or as a latent (denoted as z). The entropy model that is applied to a latent can be referred to herein as a "prior". In some examples, the quantization and/or entropy coding operations can be performed using existing quantization and entropy coding operations that are performed when encoding and/or decoding video data according to existing video coding standards. In some examples, the quantization and/or entropy coding operations can be done by the E2E-NNVC system 410. In one illustrative example, the E2E-NNVC system 410 can be trained using supervised training, with residual data being used as input and quantized codes and entropy codes being used as known output (labels) during the training.

The decoder portion 466 of the E2E-NNVC system 410 is configured to receive the output data 474 (e.g., directly from quantizer 464 and/or from the storage medium 414). The decoder portion 466 can process the output data 474 to generate a representation 476 of the input data 470 at least partially based on the output data 474. In some examples, the decoder portion 466 of the E2E-NNVC system 410 includes a neural network 468 that may include one or more transformers, one or more CNNs, one or more fully connected neural networks, one or more GRUs, one or more LS™ networks, one or more ConvRNNs, one or more ConvGRUs, one or more ConvLSTMs, one or more GANs, any combination thereof, and/or other types of neural network architectures.

The processor 404 is configured to send the output data 474 to at least one of the transmission medium 418 or the storage medium 414. For example, the output data 474 may be stored at the storage medium 414 for later retrieval and decoding (or decompression) by the decoder portion 466 to generate the representation 476 of the input data 470 as reconstructed data. The reconstructed data can be used for various purposes, such as for playback of video data that has been encoded/compressed to generate the output data 474. In some implementations, the output data 474 may be decoded at another decoder device that matches the decoder portion 466 (e.g., in the device 402, in the second device 490, or in another device) to generate the representation 476 of the input data 470 as reconstructed data. For instance, the second device 490 may include a decoder that matches (or substantially matches) the decoder portion 466, and the output data 474 may be transmitted via the transmission medium 418 to the second device 490. The second device 490 can process the output data 474 to generate the representation 476 of the input data 470 as reconstructed data.

The components of the system 400 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 400 is shown to include certain components, one of ordinary skill will appreciate that the system 400 can include more or fewer components than those shown in FIG. 4. For example, the system 400 can also include, or can be part of a computing device that includes, an input device and an output device (not shown). In some implementations, the system 400 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, and/or other wired interface) for performing communications over one or more hardwired connections, and/or other components that are not shown in FIG. 4.

In some implementations, the system 400 can be implemented locally by and/or included in a computing device. For example, the computing device can include a mobile device, a personal computer, a tablet computer, a virtual reality (VR) device (e.g., a head-mounted display (HMD) or other VR device), an augmented reality (AR) device (e.g., an HMD, AR glasses, or other AR device), a wearable device, a server (e.g., in a software as a service (SaaS) system or other server-based system), a television, and/or any other computing device with the resource capabilities to perform the techniques described herein. In one example, the E2E-NNVC system 410 can be incorporated into a portable electronic device that includes the memory 406 coupled to the processor 404 and configured to store instructions executable by the processor 404, and a wireless transceiver coupled to an antenna and to the processor 404 and operable to transmit the output data 474 to a remote device.

Figure 5:
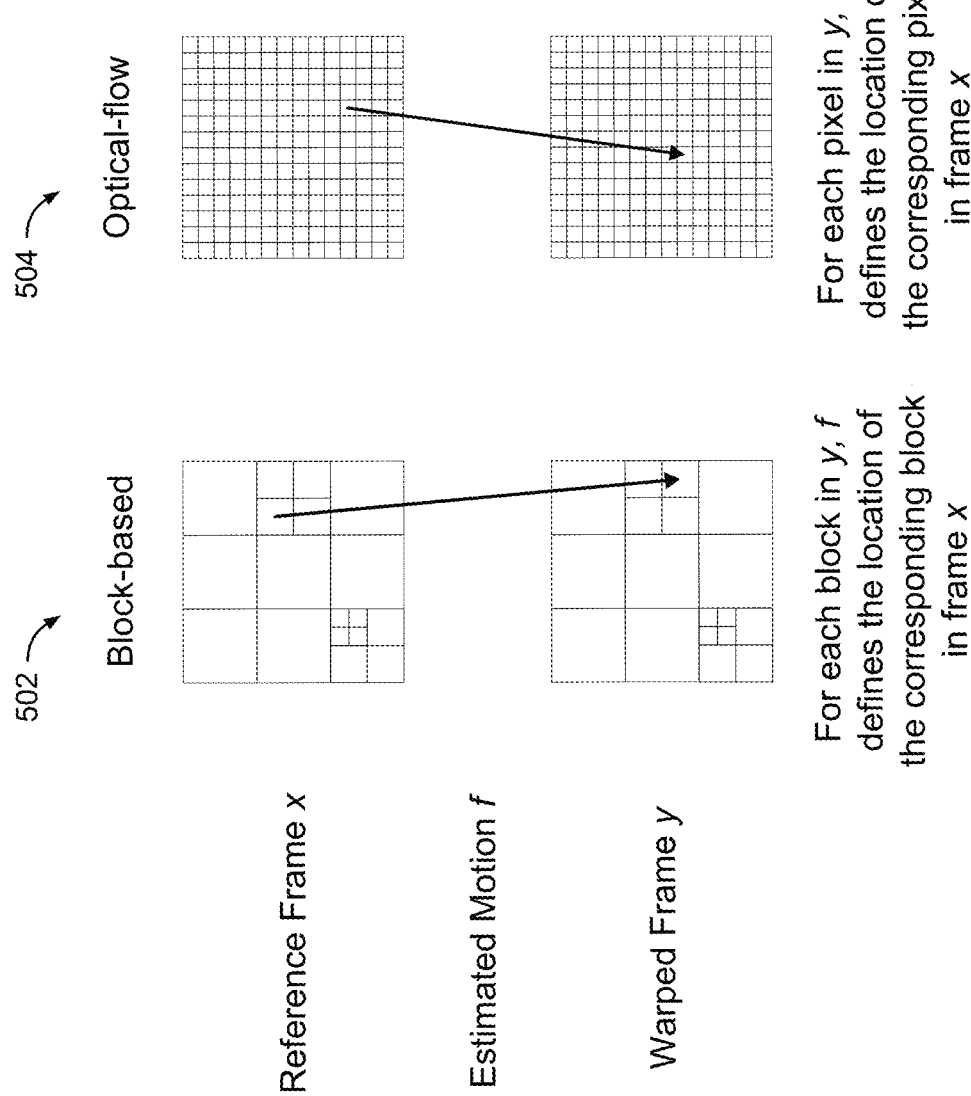
FIG. 5 is a diagram illustrating examples of motion estimation techniques, in accordance with some examples.

FIG. 5 is a diagram illustrating examples of different types of motion estimations that can be performed to determine motion information between reference frames (e.g., from a reference frame $\hat{X}_{ref_0}$ to a reference frame $\hat{X}_{ref_1}$ or vice versa). In FIG. 5, the term x denotes a reference frame from which motion can be estimated, the term f denotes a motion estimation, and the term y denotes a warped frame that can be computed as follows: y=f(x). One type of motion estimation is a block-based motion estimation technique 502. The block-based motion estimation can be performed on a block-by-block basis. For instance, for each block in the frame y, the motion estimation f defines the location of the corresponding block in the frame x. In one illustrative example, the motion estimation f can include a motion vector that indicates the displacement (e.g., the horizontal and vertical displacement) of a block in the frame y relative to the corresponding block in the frame x. A block from the frame x can be determined to correspond to a block in the frame y by determining a similarity (e.g., a similarity in pixel values) between the blocks.

Another type of motion estimation that can performed is an optical flow motion estimation technique 504. The optical flow motion estimation can be performed on a pixel-by-pixel basis. For instance, for each pixel in the frame y, the motion estimation f defines the location of the corresponding pixel in the frame x. The motion estimation f for each pixel can include motion information such as a vector (e.g., a motion vector) indicating a movement of the pixel between the frames. In some cases, optical flow maps (e.g., also referred to as motion vector maps) can be generated based on the computation of the optical flow vectors between frames. The optical flow maps can include an optical flow vector for each pixel in a frame, where each vector indicates a movement of a pixel between the frames. In one illustrative example, the optical flow vector for a pixel can be a displacement vector (e.g., indicating horizontal and vertical displacements, such as x- and y-displacements) showing the movement of a pixel from a first frame to a second frame.

In some cases, the optical flow map can include vectors for less than all pixels in a frame. For instance, a dense optical flow can be computed between frames to generate optical flow vectors for each pixel in a frame, which can be included in a dense optical flow map. In some examples, each optical flow map can include a 2D vector field, with each vector being a displacement vector showing the movement of points from a first frame to a second frame.

As noted above, an optical flow vector or optical flow map can be computed between frames of a sequence of frames. Two frames can include two directly adjacent frames that are consecutively captured frames or two frames that are a certain distance apart (e.g., within two frames of one another, within three frames of one another, or any other suitable distance) in a sequence of frames. In one illustrative example, a pixel I(x,y,t) in the frame x can move by a distance or displacement (Δx,Δy) in the frame y.

In some cases, machine learning-based video coding systems (e.g., such as neural video systems or codecs) can be used to encode and/or decode video data that includes frames of rendered content. For example, the rendered content can be generated by cloud gaming systems and/or servers, AR devices, VR devices, etc. In some aspects, rendered content can be generated based on one or more user inputs, as will be described in greater depth below.

Figure 6:
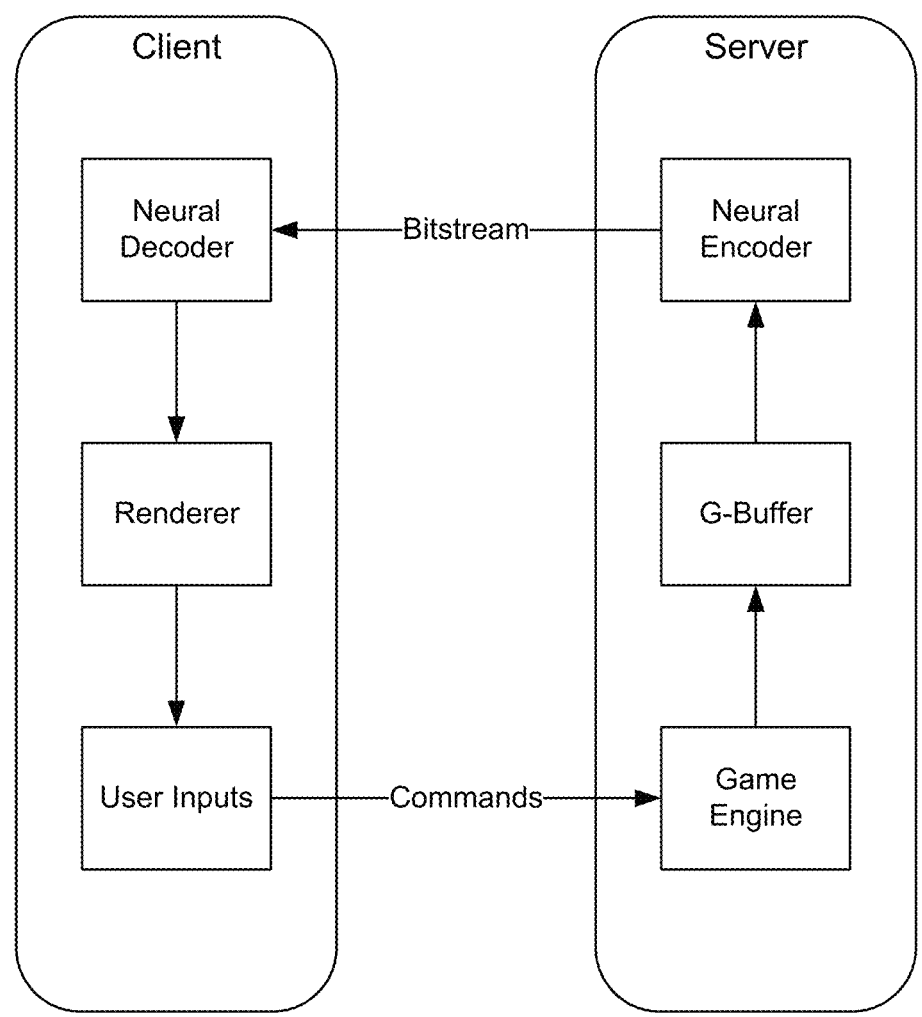
FIG. 6 is a diagram illustrating an example neural network-based video codec (e.g., coder/decoder) that can be used to perform video coding for rendered content, in accordance with some examples.

FIG. 6 is a diagram illustrating an example of a neural video coding system 600 that can be used to encode and/or decode rendered content associated with a cloud gaming system. A cloud gaming system can include one or more servers that run video games locally (e.g., on the server) and stream the output video frames to a user device that is remote from the cloud gaming server. By running video games on remote (e.g., cloud) servers or other suitable hardware processing devices, users can play video games on smaller and more portable devices, such as smartphones, that otherwise may not have sufficient computational power to run the video games locally.

For example, as depicted in FIG. 6, a cloud gaming server can include a game engine that is used to run the video game or otherwise perform the underlying processing, calculation, etc., associated with running the video game. The game engine can receive one or more user input commands for the currently running video game. For example, the user input commands can be obtained at a client device, such as a user's smartphone, or other user device connected to the cloud gaming server for a cloud gaming session. In some examples, the user input commands can include movement or directional inputs (e.g., using a joystick or hardware controller coupled to the client device, using on-screen or software controller elements provided by the client device, etc.), although it is noted that various other user input commands may also be received and utilized by the cloud gaming server.

Based on the user input commands, the game engine included in the cloud gaming server can calculate the effect or result of the user input commands in the video game environment and may update the current game state accordingly. In one illustrative example, the game engine can generate one or more updated frames of rendered video data based on the user input commands and the change(s) to the current game state. The one or more updated frames of rendered video data can be written to or otherwise stored in one or more buffers included in the cloud gaming server.

In some cases, the one or more buffers can include a deferred shading buffer and/or a geometry buffer (G-buffer). For example, a G-buffer can be used to store screen space representations of geometry and material information (e.g., generated by an intermediate rendering pass in a deferred shading rendering pipeline associated with the game engine). In some examples, the G-buffer can include rendering information associated with one or more frames of the cloud gaming video data. The rendering information can include, but is not limited to, motion information, depth information, normal information, albedo information, etc. In some cases, the rendering information can be stored in the G-buffer as maps. For example, the rendering information associated with the frames of cloud gaming video data can include, but is not limited to, motion maps (e.g., optical flow maps), depth maps, normal maps, albedo maps, etc.

The frames of cloud gaming video data can be encoded using a neural video encoder included in the cloud gaming server. As illustrated in FIG. 6, the neural video encoder can obtain the frames of cloud gaming video data (e.g., generated by the game engine in response to the user input commands) from the G-buffer, and encodes each frame into a bitstream.

The bitstream associated with the encoded frames of cloud gaming video data can be transmitted to the client or user device, where the bitstream is decoded by a neural video decoder. In some examples, the reconstructed frames of cloud gaming video data (e.g., decoded from the bitstream by the client-device neural video decoder) can be provided to a renderer included in the client device, wherein the renderer subsequently renders and displays the reconstructed frames to the user. Based on the display of the reconstructed frames, the user perceives temporal flow within the video game and provides subsequent user inputs based on the updated game state—the subsequent user inputs are transmitted to the game engine of the cloud gaming server, and the example process described above can be repeated.

Latency can be an important performance factor for cloud gaming systems. For example, an increased latency may be perceived as lag by a user. In some cases, a latency of 100 milliseconds (ms) or less may be needed for fast-paced video games and a latency of 150 ms or less may be needed for slower-paced games. In some cases, the latency threshold associated with coding video frames of rendered content, such as cloud gaming content, can be lower than a latency threshold associated with streaming live video from a server to a remote client device. For example, live video streams may tolerate a latency of up to 500 ms, based at least in part on live video streams being primarily uni-directional. The maximum latency threshold associated with coding video frames of rendered content can be the maximum end-to-end latency that may be tolerated by users, and can be impacted by the speed of the game engine, the speed of the server-side neural video encoder, the speed of the communication downlink from the cloud gaming server to the client device (e.g., used to transmit the encoded bitstream), the speed of the neural video decoder, and/or the speed of the communication uplink from the client device to the cloud gaming server (e.g., used to transmit the user input commands), etc.

In some examples, frames of rendered content (e.g., such as cloud gaming content) can be encoded and decoded based on or using a neural network-based prediction frame (P-frame) coding system, wherein a current frame is encoded/decoded based on information determined for previous frames (e.g., determined in previous time steps). In some aspects, frames of rendered content can be encoded and decoded based on or using a neural network-based P-frame coding system such as the example neural P-frame coding system 700 depicted in FIG. 7. As illustrated, the example neural P-frame coding system 700 includes a motion prediction system 702, a warping engine 704, and a residual prediction system 706. The motion prediction system 702 and the residual prediction system 706 can include any type of machine learning system (e.g., using one or more neural networks and/or other machine learning models, architectures, networks, etc.).

In some aspects, the motion prediction system 702 can include one or more autoencoders. In one illustrative example, the encoder network 705 and the decoder network 703 of motion prediction system 702 can be implemented as an autoencoder (e.g., also referred to as a "motion autoencoder" or "motion AE"). In some cases, the motion prediction system 702 can be used to implement an optical flow-based motion estimation techniques, such as the example optical flow motion estimation technique 504 illustrated in FIG. 5, and the motion autoencoder can be implemented as an optical flow autoencoder (e.g., also referred to as a "flow autoencoder" or "flow AE"). In some aspects, the residual prediction system 706 can include one or more autoencoders. In one illustrative example, the encoder network 707 and the decoder network 709 of residual prediction system 706 can be implemented as an autoencoder (e.g., also referred to as a "residual autoencoder" or "residual AE"). While the example P-frame coding system 700 of FIG. 7 is shown to include certain components, one of ordinary skill will appreciate that the example P-frame coding system 700 can include fewer or more components than those shown in FIG. 7.

In one illustrative example, for a given time t, the neural P-frame coding system 700 can receive an input frame $X_t$ and a reference frame $\hat{X}_{t-1}$. In some aspects, the reference frame $\hat{X}_{t-1}$ can be a previously reconstructed frame (e.g., as indicated by the hat operator "^") generated prior to time t (e.g., at time t−1). Input frame $X_t$ and reference frame $\hat{X}_{t-1}$ can be associated with or otherwise obtained from the same sequence of video data (e.g., as consecutive frames, etc.). For example, the input frame $X_t$ can be the current frame at time t, and the reference frame $\hat{X}_{t-1}$ can be a frame temporally or sequentially immediately prior to the input frame $X_t$. In some cases, the reference frame $\hat{X}_{t-1}$ may be received from a decoded picture buffer (DPB) of the example neural P-frame coding system 700. In some cases, the input frame $X_t$ can be a P-frame and the reference frame $\hat{X}_{t-1}$ can be an I-frame, a P-frame, or a B-frame. For example, the reference frame $\hat{X}_{t-1}$ can be previously reconstructed or generated by an I-frame coding system (e.g., which can be part of a device which includes the P-frame coding system 700 or a different device than that which includes the P-frame coding system 700), by the P-frame coding system 700 (or a P-frame coding system of a device other than that which includes the P-frame coding system 700), or by a B-frame coding system (e.g., which can be part of a device which includes the P-frame coding system 700 or a different device than that which includes the P-frame coding system 700).

Figure 7:
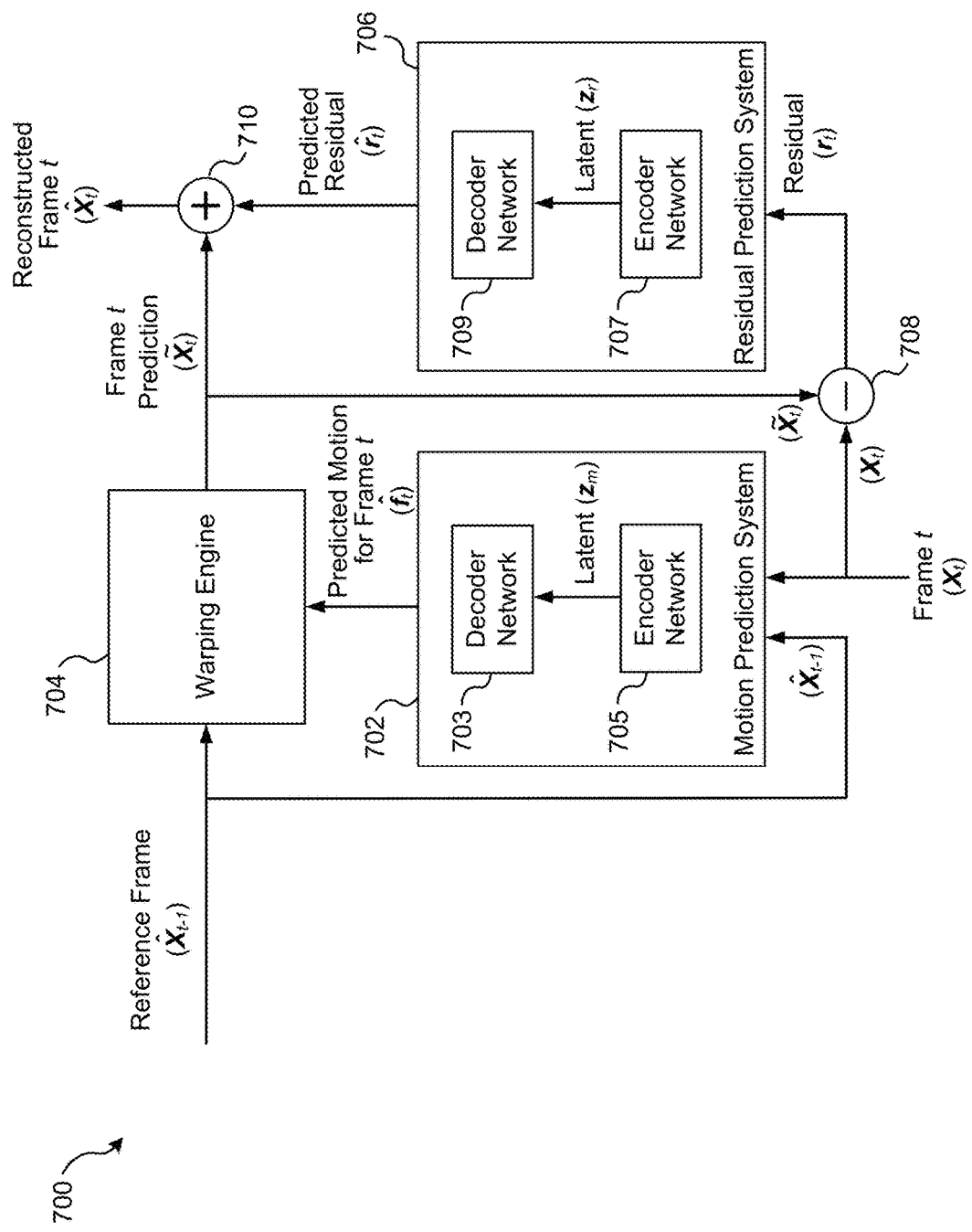
FIG. 7 is a diagram illustrating an example of a neural video coding system that can be used to perform unidirectional coding and/or bidirectional coding, in accordance with some examples.

As depicted in FIG. 7, motion prediction system 702 (e.g., a motion autoencoder, optical flow autoencoder, etc.) receives as input reference frame $\hat{X}_{t-1}$ and the current (e.g., input) frame $X_t$. Motion prediction system 702 can determine motion (e.g., represented by vectors, such as optical flow motion vectors) between pixels of reference frame $\hat{X}_{t-1}$ and pixels of input frame $X_t$. Motion prediction system 702 can then encode, and in some cases decode, this determined motion as a predicted motion $\hat{f}_t$ for input frame $X_t$.

For example, an encoder network 705 of motion prediction system 702 can be used to determine motion (e.g., motion information) between current frame $X_t$ and reference frame $\hat{X}_{t-1}$. In some aspects, encoder network 705 can encode the determined motion information into a latent representation (e.g., denoted as latent $z_m$). For example, in some cases encoder network 705 can map the determined motion information to a latent code, which can be used as the latent $z_m$. Encoder network 705 can additionally, or alternatively, convert the latent $z_m$ into a bitstream by performing entropy coding on the latent code associated with $z_m$. In some examples, encoder network 705 can quantize the latent $z_m$ (e.g., prior to entropy coding being performed on the latent code). The quantized latent can include a quantized representation of the latent $z_m$. In some cases, the latent $z_m$ can include neural network data (e.g., a neural network node's activation map or feature map) that represents one or more quantized codes.

In some aspects, encoder network 705 can store the latent $z_m$, send the latent $z_m$ to a decoder network 703 included in motion prediction system 702, and/or can send the latent $z_m$ to another device or system that can decode the latent $z_m$. Upon receiving the latent $z_m$, decoder network 703 can decode (e.g., inverse entropy code, dequantize, and/or reconstruct) the latent $z_m$ to generate a predicted motion $\hat{f}_t$ between pixels of reference frame $\hat{X}_{t-1}$ and pixels of input frame $X_t$. For example, decoder network 703 can decode the latent $z_m$ to generate an optical flow map $\hat{f}_t$ that includes one or more motion vectors mapping some (or all) of the pixels included in reference frame $\hat{X}_{t-1}$ to pixels of input frame $X_t$. Encoder network 705 and decoder network 703 can be trained and optimized using training data (e.g., training images or frames) and one or more loss functions, as will be described in greater depth below.

In one illustrative example, encoder network 705 and decoder network 703 can be included in a motion prediction autoencoder, such as an optical flow autoencoder. The optical flow autoencoder can include one or more components for quantizing the latent $z_m$ (e.g., generated as output by encoder network 705 of the optical flow autoencoder) and converting the quantized latent into a bitstream. The bitstream generated from the quantized latent can be provided as input to decoder 703 of the optical flow autoencoder.

In some examples, predicted motion $\hat{f}_t$ can include optical flow information or data (e.g., an optical flow map including one or more motion vectors), dynamic convolution data (e.g., a matrix or kernel for data convolution), or block-based motion data (e.g., a motion vector for each block). In one illustrative example, predicted motion $\hat{f}_t$ can include an optical flow map. In some cases, as described previously, an optical flow map $\hat{f}_t$ can include a motion vector for each pixel of input frame $X_t$ (e.g., a first motion vector for a first pixel, a second motion vector for a second pixel, and so on). The motion vectors can represent the motion information determined (e.g., by encoder network 705) for the pixels in current frame $X_t$ relative to corresponding pixels in reference frame $\hat{X}_{t-1}$.

The warping engine 704 of neural P-frame coding system 700 can obtain the optical flow map $\hat{f}_t$ generated as output by motion prediction system 702 (e.g., generated as output by decoder network 703/the optical flow autoencoder described above). For example, warping engine 704 can retrieve optical flow map $\hat{f}_t$ from storage or can receive optical flow map $\hat{f}_t$ from motion prediction system 702 directly. Warping engine 704 can use optical flow map $\hat{f}_t$ to warp (e.g., by performing motion compensation) the pixels of reference frame $\hat{X}_{t-1}$, resulting in the generation of a warped frame $\tilde{X}_t$. In some aspects, warped frame $\tilde{X}_t$ can also be referred to as a motion compensated frame $\tilde{X}_t$ (e.g., generated by warping the pixels of reference frame $\hat{X}_{t-1}$ based on the corresponding motion vectors included in optical flow map $\hat{f}_t$). For example, warping engine 704 can generate motion compensated frame $\tilde{X}_t$ by moving the pixels of reference frame $\hat{X}_{t-1}$ to new locations based on the motion vectors (and/or other motion information) included in optical flow map $\hat{f}_t$.

As noted above, to generate warped frame $\tilde{X}_t$, neural P-frame coding system 700 can perform motion compensation by predicting an optical flow $\hat{f}_t$ between input frame $X_t$ and reference frame $\hat{X}_{t-1}$, and subsequently generating a motion compensated frame $\tilde{X}_t$ by warping reference frame $\hat{X}_{t-1}$ using the optical flow map $\hat{f}_t$. However, in some cases, the frame prediction (e.g., motion-compensated frame $\tilde{X}_t$) generated based on optical flow map $\hat{f}_t$ may not be accurate enough to represent input frame $X_t$ as a reconstructed frame $\hat{X}_t$. For example, there may be one or more occluded areas in a scene depicted by input frame $X_t$, excessive lighting, lack of lighting, and/or other effects that results in the motion-compensated frame $\tilde{X}_t$ not being accurate enough to for use as a reconstructed input frame $\hat{X}_t$.

Residual prediction system 706 can be used to correct or otherwise refine the prediction associated with motion-compensated frame $\tilde{X}_t$. For example, residual prediction system 706 can generate one or more residuals that neural P-frame coding system 700 can subsequently combine with motion-compensated frame $\tilde{X}_t$ in order to thereby generate a more accurate reconstructed input frame $\hat{X}_t$ (e.g., a reconstructed input frame $\hat{X}_t$ that more accurately represents the underlying input frame $X_t$). In one illustrative example, as depicted in FIG. 7, neural P-frame coding system 700 can determine a residual $r_t$ by subtracting the predicted (e.g., motion-compensated) frame $\tilde{X}_t$ from input frame $X_t$ (e.g., determined using a subtraction operation 708). For example, after the motion-compensated predicted frame $\tilde{X}_t$ is determined by warping engine 704, P-frame coding system 700 can determine the residual $r_t$ by determining the difference (e.g., using subtraction operation 708) between motion-compensated predicted frame $\tilde{X}_t$ and input frame $X_t$.

In some aspects, an encoder network 707 of residual prediction system 706 can encode the residual $r_t$ into a latent $z_r$, where the latent $z_r$ represents the residual $r_t$. For example, encoder network 707 can map the residual $r_t$ to a latent code, which can be used as the latent $z_r$. In some cases, encoder network 707 can convert the latent $z_r$ into a bitstream by performing entropy coding on the latent code. In some examples, encoder network 707 can additionally, or alternatively, quantize the latent $z_r$ (e.g., before entropy coding is performed). The quantized latent $z_r$ can include a quantized representation of the residual $r_t$. In some cases, the latent $z_r$ can include neural network data (e.g., a neural network node's activation map or feature map) that represents one or more quantized codes. In some aspects, encoder network 707 can store the latent $z_r$, transmit or otherwise provide the latent $z_r$ to a decoder network 709 of residual prediction system 706, and/or can send the latent $z_r$ to another device or system that can decode the latent $z_r$. Upon receiving the latent $z_r$, decoder network 709 can decode the latent $z_r$ (e.g., inverse entropy code, dequantize, and/or reconstruct) to generate a predicted (e.g., decoded) residual $\hat{r}_t$. In some examples, encoder network 707 and decoder network 709 can be trained and optimized using training data (e.g., training images or frames) and one or more loss functions, as described below.

In one illustrative example, encoder network 707 and decoder network 709 can be included in a residual prediction autoencoder. The residual autoencoder can include one or more components for quantizing the latent $z_r$ (e.g., where the latent $z_r$ is generated as output by encoder network 707 of the residual autoencoder) and converting the quantized latent into a bitstream. The bitstream generated from the quantized latent $z_r$ can be provided as input to decoder 709 of the residual autoencoder.

The predicted residual $\hat{r}_t$ (e.g., generated by decoder network 709 and/or a residual autoencoder used to implement residual prediction system 706) can be used with the motion-compensated predicted frame $\tilde{X}_t$ (e.g., generated by warping engine 704 using the optical flow map $\hat{f}_t$ generated by decoder network 703 and/or an optical flow autoencoder used to implement motion prediction system 702) to generate a reconstructed input frame $\hat{X}_t$ representing the input frame $X_t$ at time t.

For example, neural P-frame coding system 700 can add (e.g., using addition operation 710) or otherwise combine the predicted residual $\hat{r}_t$ and the motion-compensated predicted frame $\tilde{X}_t$ to generate the reconstructed input frame $\hat{X}_t$. In some cases, decoder network 709 of residual prediction system 706 can add the predicted residual $\hat{r}_t$ to the motion-compensated frame prediction $\tilde{X}_t$. In some examples, reconstructed input frame $\hat{X}_t$ may also be referred to as a decoded frame and/or a reconstructed current frame. The reconstructed current frame $\hat{X}_t$ can be output for storage (e.g., in a decoded picture buffer (DPB) or other storage), transmission, display, for further processing (e.g., as a reference frame in further inter-predictions, for post-processing, etc.), and/or for any other use.

In one illustrative example, P-frame coding system 700 can transmit the latent data representing an optical flow map or other motion information (e.g., the latent $z_m$) and the latent data representing the residual information (e.g., the latent $z_r$) in one or more bitstreams to another device for decoding. In some cases, the other device can include a video decoder configured to decode the latents $z_m$ and $z_r$. In one illustrative example, the other device can include a video decoder implementing one or more portions of P-frame coding system 700, motion prediction system 702 (e.g., an optical flow autoencoder), and/or residual prediction system 706 (e.g., a residual autoencoder), as described above.

The other device or video decoder can decode the optical flow map $\hat{f}_t$ and/or other predicted motion information using the latent $z_m$ generated as output by the decoder network 703 included in motion prediction system 702 (e.g., generated as output by an optical flow autoencoder that includes decoder network 703). The other device or video decoder can additionally decode the residual $\hat{r}_t$ using the latent $z_r$ generated as output by the decoder network 709 included in residual prediction system 706 (e.g., generated as output by a residual autoencoder that includes decoder network 709). The other device or video decoder can subsequently use the optical flow map $\hat{f}_t$ and the residual $\hat{r}_t$ to generate the decoded (e.g., reconstructed) input frame $\hat{X}_t$.

For example, when the video decoder implements a same or similar architecture to that of the P-frame coding system 700 described above, the video decoder can include a warping engine (e.g., the same as or similar to warping engine 704) that receives as input the decoded optical flow map $\hat{f}_t$ and the reference frame $\hat{X}_{t-1}$. The video decoder warping engine can warp reference frame $\hat{X}_{t-1}$ based on motion vectors and/or other motion information determined for some (or all) of the pixels of reference frame $\hat{X}_{t-1}$, based on the decoded optical flow map $\hat{f}_t$. The video decoder warping engine can output a motion-compensated frame prediction $\tilde{X}_t$ (e.g., as described above with respect to the output of warping engine 704). The video decoder can subsequently add or otherwise combine the decoded residual $\hat{r}_t$ and the motion-compensated frame prediction $\tilde{X}_t$ to generate the decoded (e.g., reconstructed) input frame $\hat{X}_t$ (e.g., as described above with respect to the output of addition operation 710).

In some examples, motion prediction system 702 and/or residual prediction system 706 can be trained and/or optimized using training data and one or more loss functions. In some cases, motion prediction system 702 and/or residual prediction system 706 can be trained in an end-to-end manner (e.g., where all neural network components are trained during the same training process). As mentioned previously, in some examples motion prediction system 702 can be implemented as an optical flow autoencoder including encoder network 705 and decoder network 703; and residual prediction system 706 can be implemented as a residual autoencoder including encoder network 707 and decoder network 709. In some aspects, the training data can include a plurality of training images and/or training frames. In some cases, a loss function (e.g., Loss) can be used to perform training, based on motion prediction system 702 and/or residual prediction system 706 processing the training images or frames.

In one example, the loss function (e.g., Loss) can be given as Loss=$D+\beta R$, where D is a distortion between a given frame (e.g., such as input frame $X_t$) and its corresponding reconstructed frame (e.g., $\hat{X}_t$). For example, the distortion D can be determined as $D(X_t, \hat{X}_t)$. $\beta$ is a hyperparameter that can be used to control a bitrate (e.g., bits per pixel), and R is a quantity of bits used to convert the residual (e.g., residual $r_t$) to a compressed bitstream (e.g., latent $z_r$). In some examples, the distortion D can be calculated based on one or more of a peak signal-to-noise ratio (PSNR), a structural similarity index measure (SSIM), a multiscale SSIM (MS-SSIM), and/or the like. In some aspects, using one or more training data sets and one or more loss functions, parameters (e.g., weights, biases, etc.) of motion prediction system 702 and/or residual prediction system 706 can be tuned until a desired video coding result is achieved by example neural P-frame coding system 700.

In some examples, one or more of the encoder network(s), decoder network(s), autoencoder network(s), and/or codec(s) described herein can be implemented based on or using a Scale-Space Flow (SSF) architecture. In some aspects, an SSF architecture can be augmented with one or motion compensation steps. For example, augmenting an SSF architecture with at least one motion compensation step can make better use of available rendered content (e.g., one or more depth maps, one or more optical flow maps, etc.). In some examples, an SSF architecture can be augmented with one or more motion compensation steps to correct for (e.g., compensate for) camera motion. Correcting or compensating for camera motion can improve rate distortion and coding efficiency of the augmented SSF architecture and/or one or more of the codecs implemented using the systems and techniques described herein. In some aspects, region of interest-coding (ROI-coding) can be implemented based on one or more ROI-aware losses and/or the conditioning of one or more encoder networks on a ROI mask.

In some examples, the systems and techniques described herein can perform or apply camera motion compensation for inputs that include rendered content. In some aspects, the systems and techniques described herein can be associated with a Bjøntegaard Delta (BD) rate savings on the TartanAir dataset (e.g., over an SSF architecture analyzed on the same TartanAir dataset). In some cases, the use of ROI-coding may be associated with greater coding flexibility for the systems and techniques described herein. For example, one or more depth maps can be used as a proxy for one or more ROI maps. In some aspects, the use of ROI-coding may be associated with a rate savings compared to a non-ROI implementation (e.g., SSF), while maintaining perceived quality of the coded input(s) and/or output(s). In some examples, one or more GameCodec parameters can be adapted to specific game environments, and may be associated with an additional BD rate gain. In some cases, the BD rate gain associated with adapting GameCodec parameters to gamer environments can be based at least in part on a scene type associated with a given game environment. In some examples, the systems and techniques can be used to implement instance-adaptive coding.

In some examples, an SSF-based implementation can be trained using the rate-distortion (RD) loss $\mathcal{L}$, with a parameter $\beta$ used to tradeoff rate for distortion (e.g., $\mathcal{L}=D+\beta \cdot R$). In some aspects, the systems and techniques can perform training based on a modified ROI-aware objective, for example using a loss function $\mathcal{L}_{ROI}=D_{ROI}+\beta R$.

$D_{ROI}$ is the Mean-Squared Error distortion metric between a ground-truth frame sequence x and its reconstruction $\hat{x}$, weighted by the importance map sequence m whose values are in (0,1) (e.g., with N representing the total number of elements in the sequence):

$$D_{ROI} = \frac{1}{N} \sum_{i}^{N} m_i \cdot (x_i - \hat{x}_i)^2$$

In some examples, $\mathcal{L}_{ROI}$ can be a generalized loss definition, supporting the case where the importance mask is continuous instead of binary (e.g., based on the use of depth map(s) as surrogate(s) for importance, together with the human visual system model of acuity decreasing exponentially from a focal point and leading to continuous importance maps with peaks near estimated focal points and close objects).

In some aspects, training can be performed based on sampling a temporally-coherent Perlin noise mask $m_p$ of same dimension as the frame sequence x. The noise mask $m_p$ can be rescaled to (0,1) and used to define the importance mask as $m = 1 - \alpha \cdot m_p$, where $\alpha$ is a scalar in (0,1) which controls the focus on ROI. In some cases, if $\alpha$ is 0, then the importance map m may be all-ones, and $\mathcal{L}_{ROI}$ degenerates to the non-ROI case $\mathcal{L}$.

In some examples, an evaluation phase of training can use an importance map based on the depth mask and the hyperparameter a, which can be used to control or adjust the amount of disparity that should be present between foreground and background regions in terms of image quality. For example, denoting the depth map sequence z, an importance map m can be used where $$m = 1 - \alpha \cdot \frac{z - z_{min} \gamma}{z_{max} - z_{min}},$$

where $z_{min}$ and $z_{max}$ are the minimum and maximum value (respectively) for depth for the associated game engine, and $\gamma$ is a hyperparameter controlling the power-law transformation of the depth map. In some cases, $\gamma$ can be adjusted at test time to control the drop-off between foreground and background (e.g., softer if $\gamma<1$ and steeper if $\gamma>1$).

In some aspects, learned codecs can be more easily finetuned to an application domain (e.g., relative to standard codecs). In the example of cloud gaming, the systems and techniques can use one or more models, neural network, machine learning networks, autoencoders, etc., that are finetuned on different game scenarios in a dataset. A boost in R-D performance can be observed when evaluating on unseen sequences from the same game. In some aspects, updated model weights can be transmitted to update a receiver-side codec prior to starting a transmission (e.g., representing at most tens of megabytes).

As mentioned previously, in some examples frames of rendered video content (e.g., such as cloud gaming content) can be encoded and decoded using a neural video coding system that is the same as or similar to the example neural P-frame coding system 700 described above. For example, a current frame of cloud gaming content (or other rendered video content) can be coded based on determining an optical flow map or other motion information for the current frame, along with a residual map.

In some aspects, the motion between successive frames of video content can be based on object motion and camera motion. In the example of FIG. 7, both object motion and camera motion are predicted or otherwise determined using the single motion prediction system 702. In some examples, the use of a single motion prediction system to perform camera-based motion compensation and object-based motion compensation can decrease the performance and/or accuracy of the example neural P-frame coding system 700, such as for coding video content that includes significant camera motion over short periods of time. For example, frames of cloud gaming content may include significant camera motion over short periods of time (e.g., based on rapid user inputs, point-of-view manipulations, etc., while gaming). In some aspects, the systems and techniques described herein can be used to encode and decode frames of video content, including frames of rendered video content, based on decomposing camera motion compensation and object motion compensation, as will be described in greater depth below.

Figure 8:
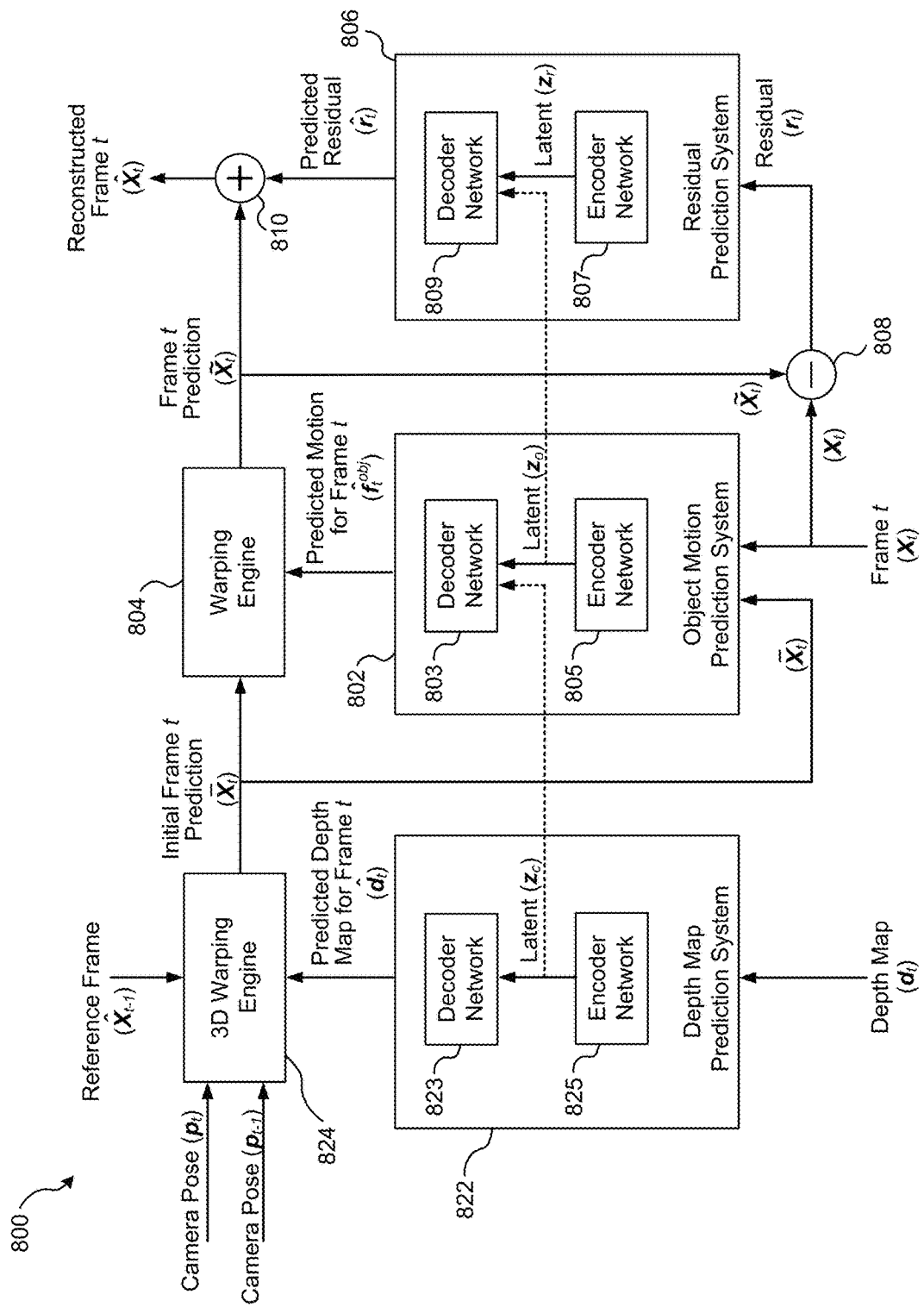
FIG. 8 is a diagram illustrating an example of a machine learning-based video coding system including a motion compensation sub-network and an object motion compensation sub-network, in accordance with some examples.

FIG. 8 is a diagram illustrating an example of a machine learning-based video coding system 800 that includes a depth map prediction system 822 and an object motion prediction system 802. In one illustrative example, depth map prediction system 822 can be used to compensate camera motion using rendering information associated with the currently encoded or decoded frame of rendered video data (e.g., a frame of rendered cloud gaming content), as will be described in greater depth below. In some aspects, object motion prediction system 802 can be used to compensate object motion using optical flow-based warping (e.g., as described above with respect to object motion prediction system 702 illustrated in FIG. 7). In some cases, object motion prediction system 802 can be the same as or similar to the object motion prediction system 702 illustrated in FIG. 7. For example, object motion prediction system 802 can be implemented as an optical flow autoencoder that includes the encoder network 805 and the decoder network 803.

As described previously, video content that includes rendered frames of video data (e.g., computer generated or animated visual content, AR content, VR content, gaming content, etc.) may include relatively greater motion between successive frames than natural video content (e.g., video content captured by a camera). In some cases, rendered frames of video data can include relatively greater camera motion and relatively greater object motion than a natural content video data.

In the example of a rendered frames of gaming content (e.g., generated by or otherwise obtained from a cloud gaming system such as the cloud gaming system 600 illustrated in FIG. 6), an associated camera motion between successive frames can be relatively high based on frequent and/or large movements made by a user playing the video game, wherein the user movements or inputs are associated with corresponding changes in the camera point-of-view (POV) and/or field-of-view (FOV). Also in the example of rendered frames of gaming content, an associated object motion between successive frames can be relatively high based on factors such as the rendered frames of gaming content corresponding to large and/or complicated scenes (e.g., which may include large-sized objects, highly detailed or granular objects, various visual and/or particle effects such as light, rain, smoke, etc.)

In one illustrative example, the systems and techniques described herein can perform video coding for frames of video content (e.g., frames of rendered and/or gaming content) based on using separate motion prediction systems to perform camera motion compensation and to perform object motion compensation. For example, depth map prediction system 822 can be used to perform camera motion compensation based on rendering information associated with one or more frames of the video content, as will be explained in greater depth below.

In one illustrative example, rendering information associated with one or more frames of the currently encoded/decoded video content can include a current camera pose $p_t$ (e.g., the camera pose associated with the current frame t), a reference camera pose $p_{t-1}$ (e.g., the camera pose associated with the prior frame t−1), and a depth map $D_t$ associated with the current frame t. Camera pose information can include position and orientation information of a camera with respect to a reference coordinate system of the scene depicted in the video content (e.g., the scene captured by the camera). A depth map can be an image that includes information associated with the distance of the surfaces of scene objects from a given viewpoint (e.g., the viewpoint of the camera that captures the scene). In some examples, a depth map can have the same pixel dimensions as a corresponding frame of video data for which the depth map is generated, wherein some (or all) of the pixels included in the depth map are associated with a depth value. The depth value associated with a given pixel can indicate a distance from the camera viewpoint to the surface of the scene object depicted by the given pixel.

In examples in which the frames of video content coded (e.g., encoded and/or decoded) using the example neural video coding system 800 are frames of rendered video data, the camera pose information and depth information may be generated in association with rendering the video frames (e.g., generated at the time the video frame is originally generated, prior to encoding or decoding). For example, camera pose and depth information can be obtained from one or more rendering engines associated with generating the rendered frames, based on the rendering engines having used the camera pose and depth information to originally generate the rendered frames. In some aspects, camera pose and depth information associated with frames of rendered gaming content can be obtained from one or more buffers associated with a rendering or game engine used to generate the gaming content. For example, camera pose and depth information associated with frames of rendered gaming content generated by the game engine depicted in the cloud gaming server of FIG. 6 can be obtained from a deferred rendering buffer and/or geometry buffer (G-buffer) associated with the game engine. In some examples, the camera pose and depth information may be stored in a deferred rendering buffer or G-buffer among various other types of rendering information (e.g., motion information, optical flow information such as optical flow maps, normal maps, albedo maps, etc.).

In some examples, the systems and techniques described herein can be used to perform video coding based on separate camera motion compensation and object motion compensation for non-rendered video content (e.g., natural video content). For example, the camera pose information $p_t$ and $p_{t-1}$ can be obtained from a camera used to captured the non-rendered or natural video content, can be determined using one or more post-processing algorithms or machine-learning networks, etc. In some cases, depth information can be obtained from a camera that includes one or more depth sensors and captures depth information and video content simultaneously (e.g., such that the video content is captured in combination with a corresponding depth map for one or more frames of the captured video content). In some aspects, depth information can be obtained from a stereo camera that includes two or more cameras for determining depth maps.

In one illustrative example, depth map prediction system 822 and 3D warping engine 824 can be used to generate an initial frame prediction $\overline{X}_t$ that is compensated using camera motion determined based on the input camera pose $p_t$, reference camera pose $p_{t-1}$, and depth map $D_t$. In some aspects, the initial frame prediction $\overline{X}_t$ may also be referred to as a camera motion compensated frame. As illustrated, 3D warping engine 824 can generate the initial frame prediction $\overline{X}_t$ based on receiving as input the camera pose $p_t$ for the current frame t, the reference camera pose $p_{t-1}$ for the previous frame t−1, the previously decoded (e.g. reconstructed) frame $\hat{X}_{t-1}$, and a predicted (e.g., reconstructed) depth map $\hat{d}_t$ for the current frame t.

The camera poses $p_t$ and $p_{t-1}$, along with the depth map $D_t$ can be generated by a rendering engine (e.g., a cloud gaming engine) associated with a neural video encoder implementing the example architecture of FIG. 8. In one illustrative example, the neural video encoder implementing the example architecture of FIG. 8 can be included in a same server or other computing device as the rendering engine used to generate the frames of rendered video data being encoded (e.g., which may also be the same rendering engine used to generate the camera poses $p_t$ and $p_{t-1}$, along with the depth map $D_t$).

A neural video decoder implementing some or all of the example architecture of FIG. 8 can receive the camera poses $p_t$ and $p_{t-1}$ from the neural video encoder and/or the server (e.g., rendering engine) associated with the neural video encoder. In some examples, the neural video decoder may receive only the current camera poses $p_t$ associated with the currently coded frame of rendered video data, based on the neural video decoder receiving the reference camera pose $p_{t-1}$ as the current camera pose for the prior frame (e.g., the neural video decoder can store the camera poses received from the neural video encoder for use in decoding future or subsequent frames of the rendered video content).

In some aspects, rather than transmitting the depth map $D_t$ from the neural video encoder to the neural video decoder, the systems and techniques can use depth map prediction system 822 to perform depth map compression. For example, depth map $D_t$ can be provided as input to an encoder network 825 included in depth map prediction system 822, which in some cases may be implemented as an autoencoder. Encoder network 825 can generate as output a latent representation $z_c$ of the depth map $D_t$. In some aspects, the latent representation $z_c$ can be converted into a bitstream and transmitted to the neural video decoder implementing the example architecture of FIG. 8.

For example, the latent representation $z_c$ of depth map $D_t$ can be provided as input to a decoder network 823 included in depth map prediction system 822. In some aspects, both the neural video encoder and the neural video decoder can include the decoder network 823. Based on receiving the latent representation $z_c$ as input, the decoder network 823 can generate as output a predicted depth map $\hat{d}_t$ for the currently coded frame t. In some examples, the predicted depth map $\hat{d}_t$ may also be referred to as the "reconstructed depth map."

3D warping engine 824 can generate the initial frame prediction $\overline{X}_t$ (e.g., the camera motion compensated frame) by warping the previously reconstructed frame $\hat{X}_{t-1}$ based on the camera poses $p_t$ and $p_{t-1}$, and the reconstructed depth map $\hat{d}_t$. For example, the camera poses $p_t$ and $p_{t-1}$ can be used to estimate a 3D camera transformation, $T(p_t, p_{t-1})$, associated with the motion or movement of the camera between the pose at time t and the pose at time t−1. An inverse projection can be performed based on the reconstructed depth map $\hat{d}_t$ and a camera projection matrix P (e.g., also referred to as a "back projection"). The output of the inverse projection can be a set of 3D scene coordinates with the camera at time t.

The estimated 3D camera transformation $T(p_t, p_{t-1})$ and the output of the inverse projection (e.g., the set of 3D scene coordinates with the camera at time t) can be provided as inputs to a 3D point transformation, which generates as output a set of 3D scene coordinates with the camera at time t−1. A camera projection can be performed to transform the 3D scene coordinates with the camera at time t−1 into a set of 2D scene coordinates with the camera at time t−1. The camera projection into the 2D scene coordinates can utilize the same camera projection matrix P that was used to perform the prior inverse projection.

Based on the camera projection of 2D scene coordinates with the camera at time t−1, an estimated correspondence can be determined between $I_t$ (e.g., the frame or scene captured by the camera at time t) and $I_{t-1}$ (e.g., the frame or scene captured by the camera at time t−1). The estimated 2D correspondence between $I_t$ and $I_{t-1}$ can be provided as input to a bilinear warping engine. In some aspects, the bilinear warping engine can be the same as or included in the 2D warping engine 824. In addition to the estimated 2D correspondence between $I_t$ and $I_{t-1}$, the bilinear warping engine can additionally receive as input the previously reconstructed frame $\hat{X}_{t-1}$ (e.g., as illustrated in FIG. 8 with respect to 3D warping engine 824). Based on performing a bilinear warping between the estimated 2D correspondence between $I_t$ and $I_{t-1}$, and the previously reconstructed frame $\hat{X}_{t-1}$, a camera compensated frame can be generated as output. In some aspects, the camera compensated frame generated as output based on the bilinear warping described above can be the same as the initial frame prediction $\overline{X}_t$ generated by the 3D warping engine 824.

The camera motion compensated frame $\overline{X}_t$ can subsequently be provided to an additional warping engine 804. As illustrated, additional warping engine 804 may also receive as input a predicted optical flow map $\hat{f}_t^{obj}$ (as an example of optical flow information) associated with the object motion for the current frame t. In some aspects, the systems and techniques can perform an accumulative warping based on using warping engine 804 to warp the camera motion compensated frame $\overline{X}_t$ with the predicted object motion optical flow map $\hat{f}_t^{obj}$ (e.g., an accumulative warping based on the camera motion compensated frame $\overline{X}_t$ having been generated using a previous warping operation performed by 3D warping engine 824).

In some aspects, the object motion prediction system 802 can be the same as or similar to the object motion prediction system 702 described above with respect to FIG. 7, and the object motion optical flow map $\hat{f}_t^{obj}$ can be generated in a same or similar manner as the optical flow map $\hat{f}_t$ also described above with respect to FIG. 7. For example, the object motion optical flow map $\hat{f}_t^{obj}$ can be generated based on providing the camera motion compensated frame $\overline{X}_t$ and the currently coded frame $X_t$ as input to an encoder network 805 of object motion prediction system 802, which may be implemented as an optical flow autoencoder. Encoder network 805 can determine an optical flow between the two input frames, and generate as output a latent representation $z_p$ of the determined optical flow map. As described above with respect to depth map prediction system 822, in some aspects the object motion prediction system 802 can convert the latent representation $z_p$ into a bitstream that is transmitted from the neural video encoder to the neural video decoder. The bitstream representation of the latent $z_p$ can be provided as input to decoder network 803, which generates as output the predicted (e.g., reconstructed) optical flow map $\hat{f}_t^{obj}$ representing the optical flow between the camera motion compensated frame $\overline{X}_t$ and the input (e.g., currently coded) frame $X_t$.

In some aspects, the latent representation $z_c$ of the depth map $D_t$ can be provided as an additional input to object motion prediction system 802. For example, object motion prediction system 802 can concatenate the latent representation $z_c$ of the depth map $D_t$ with the latent representation $z_p$ of the optical flow map generated by encoder network 805. Based on receiving as input both the latent representation $z_c$ of the depth map $D_t$ (e.g., associated with the camera motion) and the latent representation $z_p$ of the optical flow map (e.g., associated with the object motion), in some aspects decoder network 803 can generate the reconstructed optical flow map $\hat{f}_t^{obj}$ to include object motion information without including camera motion information. For example, the decoder network 803 can remove camera motion information from the reconstructed optical flow map $\hat{f}_t^{obj}$ based on analyzing the latent representation $z_c$ of the depth map $D_t$ (e.g., associated with the camera motion).

Warping engine 804 can generate as output a predicted motion compensated frame $\tilde{X}_t$ by warping the camera motion compensated frame $\overline{X}_t$ based on the reconstructed object motion optical flow map $\hat{f}_t^{obj}$ (e.g., in a same or similar manner to as described previously with respect to the fame prediction output by warping engine 704 illustrated in FIG. 7). In one illustrative example, a predicted motion compensated frame $\tilde{X}_t$ includes motion compensation for camera motion (e.g., based on the first warp performed by 3D warping engine 824) and includes motion compensation for object motion (e.g., based on the second warp performed by warping engine 804).

The predicted motion compensated frame $\tilde{X}_t$ can be refined based on a predicted (e.g., reconstructed) residual $\hat{r}_t$, which in some aspects can be performed in a manner that is the same as or similar to that described with respect to the residual $\hat{r}_t$ described above with respect to FIG. 7. In one illustrative example, residual prediction system 806 (which can be the same as or similar to the residual prediction system 706 illustrated in FIG. 7), can receive an additional input comprising the latent representation $z_p$ generated by the object motion prediction system 802. For example, decoder network 809 included in residual prediction system 806 can concatenate the latent representation $z_p$ with the latent residual representation $z_r$, and can generate as output the reconstructed residual $\hat{r}_t$ based on the two concatenated latent representations.

An addition operation 810 can be used to add or otherwise combine the predicted motion compensated frame $\tilde{X}_t$ and the reconstructed residual $\hat{r}_t$, generating as output the reconstructed current frame $\hat{X}_t$.

In one illustrative example, the systems and techniques can compensate camera motion using rendered optical flow information (e.g., a rendered optical flow map) generated based on the current camera pose $p_t$, the reference camera pose $p_{t-1}$, and the depth map $D_t$. For example, rather than providing the camera pose information $p_t$ and $p_{t-1}$ as inputs to the warping engine 824 and providing the depth map $D_t$ as input to the encoder network 825 of camera motion prediction system 822, the systems and techniques can generate a rendered optical flow map using these same three inputs (e.g., $p_t$, $p_{t-1}$, and $D_t$) and provide the rendered optical flow map as input to the encoder network 825 of camera motion prediction system 822.

Figure 9:
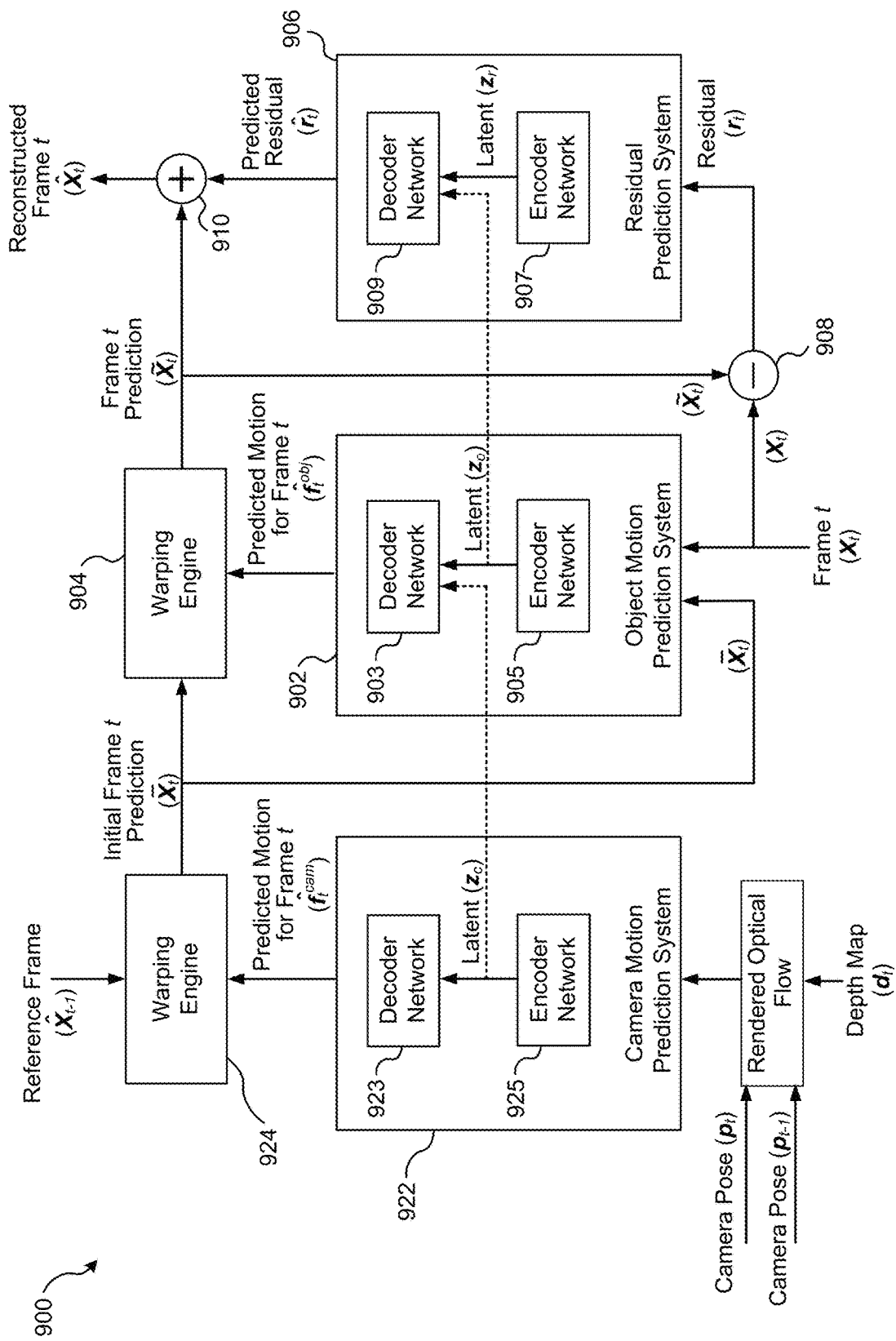
FIG. 9 is a diagram illustrating another example of a machine learning-based video coding system including a motion compensation sub-network and an object motion compensation sub-network, in accordance with some examples.

FIG. 9 is a diagram illustrating an example of a machine learning-based video coding system 900 that utilizes rendered optical flow information (e.g., a rendered optical flow map) generated based on ($p_t$, $p_{t-1}$, and $D_t$) as input for generating a camera motion compensated frame $\overline{X}_t$ using a camera motion prediction system 922 and a warping engine 924. In one illustrative example, the machine learning-based video coding system 900 depicted in FIG. 9 can be the same as or similar to the machine learning-based video coding system 800 depicted in FIG. 8. For example, the camera motion prediction system 922 and warping engine 924 can be the same as or similar to the camera motion prediction system 822 and warping engine 824 illustrated in FIG. 8, the object motion prediction system 902 and warping engine 904 can be the same as or similar to the object motion prediction system 802 and warping engine 804 illustrated in FIG. 8, etc.

In the example of FIG. 9, the rendered optical flow can be generated based on $p_t$, $p_{t-1}$, and $D_t$ by the neural video encoder implementing the example architecture 900 of FIG. 9 and/or can be generated by a rendering engine, server, cloud gaming server, or other computing device associated with the neural video encoder. In some examples, the neural video encoder and the computing device used to generate the rendered optical flow can be included in the same device. In some aspects, the rendered optical flow map can include camera motion information that is determined based on the current camera pose $p_t$ and the previous camera pose $p_{t-1}$, and the current depth map $D_t$. The rendered optical flow can be provided as input to encoder network 925 of camera motion prediction system 922, which generates as output a latent representation $z_c$ of the rendered optical flow. In some aspects, the latent representation $z_c$ can include or otherwise be associated with camera motion information between frames t and t−1, based at least in part on this camera motion information being included in the rendered optical flow map.

In some aspects, a neural video decoder implementing some or all of example architecture 900 can generate the camera motion compensated frame $\overline{X}_t$ based on receiving only the latent $z_c$ from a corresponding neural video encoder (e.g., a neural video encoder also implementing some or all of example architecture 900). In some cases, the latent $z_c$ can be converted to a bitstream and transmitted to the decoder network 923 and/or camera motion prediction system 922 included in the neural video decoder. The decoder network 923 can receive the latent $z_c$ as input and generate as output a predicted (e.g., reconstructed) optical flow map $\hat{f}_t^{cam}$ for the current frame t. In some aspects, the reconstructed optical flow map $\hat{f}_t^{cam}$ can be an optical flow map associated with motion information determined between the previous frame t−1 and the current frame t (e.g., the same or similar as the motion information included in the rendered optical flow map determined at the neural video encoder side). Based on warping engine 924 receiving the reconstructed camera motion optical flow map $\hat{f}_t^{cam}$ as input, warping engine 924 can generate the camera motion compensated frame $\overline{X}_t$ without receiving the camera pose information $p_t$ and $p_{t-1}$ from the neural video encoder (or associated rendering engine/server), as was the case in the example of FIG. 8.

In some aspects, based on utilizing the rendered optical flow as input to camera motion prediction system 922, fewer bits may be transmitted between the neural video encoder side and the neural video decoder side for each respective frame of video data (e.g., rendered video data and/or gaming content video data), as transmitting only the latent representation $z_c$ of the rendered optical flow map may utilize fewer bits than transmitting the latent representation of the depth map $D_t$ and one or more of the camera poses $p_t$ and $p_{t-1}$ (e.g., as was the case with respect to FIG. 8).

In some examples, the machine learning-based video coding systems 800 and 900, illustrated and described above with respect to FIGS. 8 and 9 respectively, can generate a reconstructed frame $\hat{X}_t$ based on performing an accumulative warping for the camera motion compensated frame $\overline{X}_t$ and the object motion compensated frame $\hat{X}_t$ (e.g., accumulative based on the object motion compensated frame $\hat{X}_t$ being generated based on receiving the previously warped the camera motion compensated frame $\overline{X}_t$ as input). In some aspects, the systems and techniques can generate the reconstructed frame $\hat{X}_t$ based on performing camera motion compensation and object motion compensation separately, without performing an accumulative warping between the camera motion compensated result and the object motion compensated result.

Figure 10:
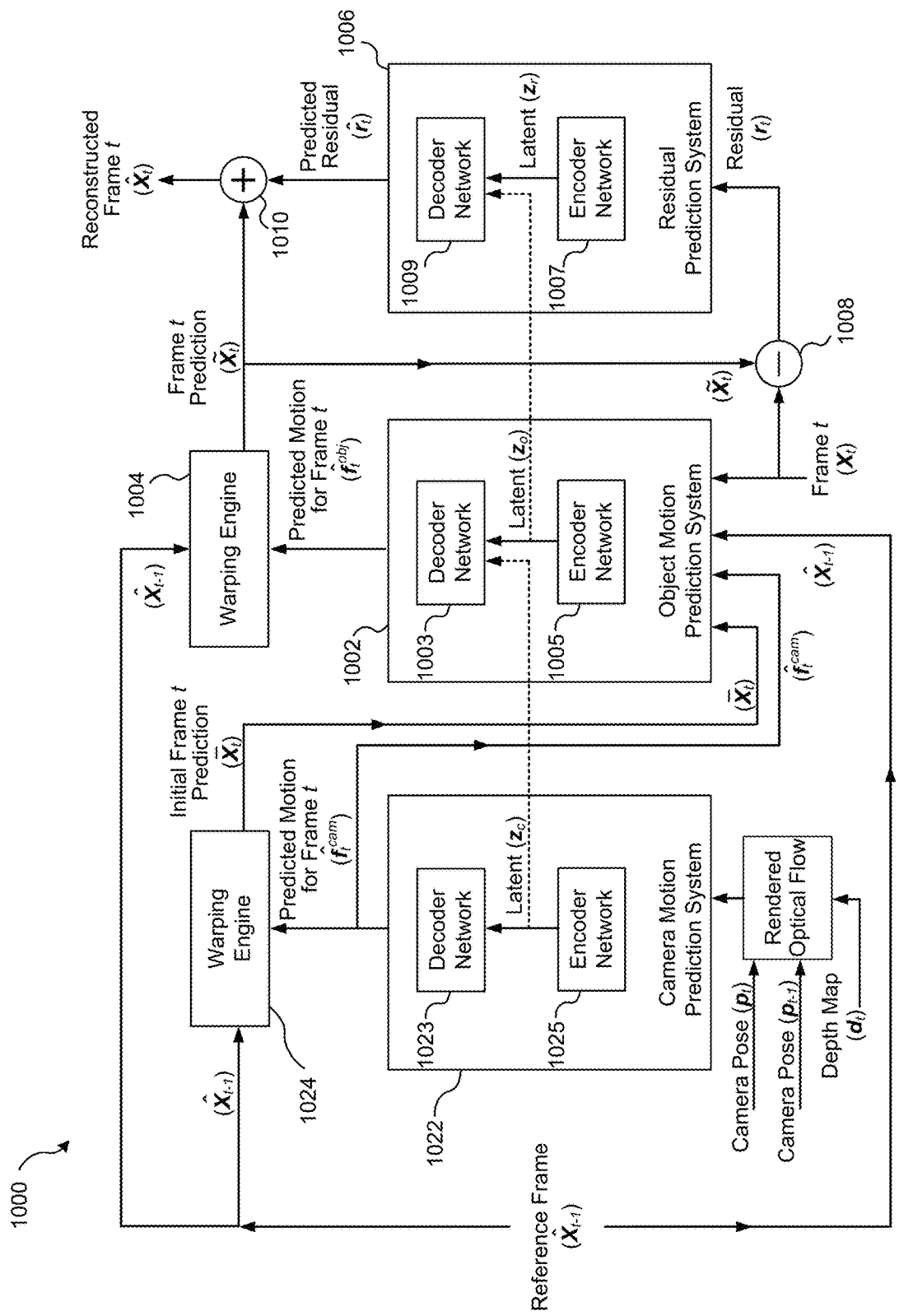
FIG. 10 is a diagram illustrating another example of a machine learning-based video coding system including a motion compensation sub-network and an object motion compensation sub-network, in accordance with some examples.

For example, FIG. 10 is a diagram illustrating an example of a machine learning-based video coding system 1000 that can be used to generate the reconstructed frame $\hat{X}_t$ based on performing optical flow compression, iterative flow estimation, and residual flow estimation, without performing accumulative warping. In one illustrative example, the machine learning-based video coding system 1000 depicted in FIG. 10 can be the same as or similar to one or more of the machine learning-based video coding system 900 illustrated in FIG. 9 and/or the machine learning-based video coding system 800 illustrated in FIG. 8. For example, the camera motion prediction system 1022 and warping engine 1024 can be the same as or similar to one or more of the camera motion prediction systems 922 and/or 824 and the warping engines 924 and/or 824 illustrated in FIGS. 9 and 8 respectively; the object motion prediction system 1002 and warping engine 1004 can be the same as or similar to one or more of the object motion prediction systems 902 and/or 802 and the warping engines 904 and/or 804 illustrated in FIGS. 9 and 8, respectively; etc.

In the example of FIG. 10, a rendered optical flow can be generated based on the camera poses $p_t$ and $p_{t-1}$, and the depth map $D_t$ as was described above with respect to FIG. 9. As illustrated, the camera motion prediction system 1022 can receive as input the rendered optical flow map, in a same or similar manner as was described with respect to the camera motion prediction system 922 illustrated in FIG. 9. The camera motion prediction system 1022 may additionally generate as output a reconstructed camera motion optical flow map $\hat{f}_t^{cam}$ that is the same as or similar to the reconstructed camera motion optical flow map generated by camera motion prediction system 922 illustrated in FIG. 9. The warping engine 1024 may receive as input the previously reconstructed (e.g., reference) frame $\hat{X}_{t-1}$ and the reconstructed camera motion optical flow map $\hat{f}_t^{cam}$, which can be the same as or similar to that described above with respect to warping engine 924 illustrated in FIG. 9.

As depicted in FIG. 10, the output generated by the warping engine 1024 (e.g., the camera motion compensated frame $\overline{X}_t$) can be provided as input only to the object motion prediction system 1002 (e.g., rather than being provided as input to both the object motion prediction system 1002 and the warping engine 1004, as was depicted with respect to FIG. 9 and the object motion prediction system 902 and warping engine 904). As illustrated in FIG. 10, the reconstructed camera motion optical flow map $\hat{f}_t^{cam}$ generated by the camera motion prediction system 1022 can additionally be provided as an input to the object motion prediction system 1002.

In one illustrative example, the object motion prediction system 1002 can receive as input the currently coded frame $X_t$ and the camera motion compensated frame $\overline{X}_t$ (e.g., the same as or similar to as described above with respect to the object motion prediction systems 802 and 902 illustrated in FIGS. 8 and 9, respectively). Additionally, the object motion prediction system 1002 can receive as input the reconstructed camera motion optical flow map $\hat{f}_t^{cam}$ (e.g., from camera motion prediction system 1022) and the previously reconstructed reference frame $\hat{X}_{t-1}$.

In some aspects, the example architecture 1000 illustrated in FIG. 10 can be used to correct the camera motion compensation/camera motion optical flow $\hat{f}_t^{cam}$ directly, prior to performing a second warp (e.g., the warp performed by warping engine 1004) to add the object motion compensation on top of the already warped camera motion compensated frame $\overline{X}_t$. For example, the warping engine 1004 does not receive the camera motion compensated frame $\overline{X}_t$ directly, and does not apply a warping based on the object motion optical flow $\hat{f}_t^{obj}$ to the camera motion compensated frame $\overline{X}_t$ (e.g., as in FIGS. 8 and 9). Instead, the camera motion compensated frame $\overline{X}_t$ is provided as input to the object motion prediction system 1002, which generates an object motion optical map $\hat{f}_t^{obj}$ that includes both the object motion optical flow information and camera motion optical flow correction information. For example, the object motion prediction system 1002 can generate the corrected camera motion compensated output (e.g., the portion of the object motion optical map $\hat{f}_t^{obj}$ associated with camera motion optical flow correction information) based on receiving the additional inputs of the previously reconstructed reference frame $\hat{X}_{t-1}$ and the camera motion compensated frame $\overline{X}_t$.

The output of the object motion prediction system 1002 (e.g., the object motion optical map $\hat{f}_t^{obj}$ including object motion optical flow information and camera motion optical flow correction information) can be provided as input to the warping engine 1004. The warping engine 1004 can generate as output the predicted current frame $\hat{X}_t$ by warping the previously reconstructed frame $\hat{X}_{t-1}$ based on the object motion optical map $\hat{f}_t^{obj}$ rather than warping the camera motion compensated frame $\overline{X}_t$ based on an object motion optical map that does not include camera motion optical flow corrections, as was the case with respect to FIGS. 8 and 9). In one illustrative example, the systems and techniques can utilize the example architecture 1000 illustrated in FIG. 10 to generate an initial camera motion compensated frame $\overline{X}_t$, correct the initial camera motion compensated frame $\overline{X}_t$ based on an object motion optical flow map $\hat{f}_t^{obj}$ that includes object motion optical flow information and camera motion optical flow correction information, and generate the predicted current frame $\hat{X}_t$ by warping the previously reconstructed frame $\hat{X}_{t-1}$ based on the object motion optical map $\hat{f}_t^{obj}$ with camera motion corrections.

FIG. 11 is a flowchart illustrating an example of a process 1100 for processing video data. At block 1102, the process 1100 includes obtaining a frame of encoded video data associated with an input frame, the frame of encoded video data including camera information associated with generating the video data and a residual. For example, some (or all) of the frame of encoded video data can be obtained from one or more of the encoder networks 825, 805, and/or 807 illustrated in FIG. 8. In some cases, the camera information can include one or more of a camera projection matrix, camera pose information associated with the input frame, and depth information associated with the input frame.

For example, the camera projection matrix can be used to perform 3D warping, such as by using the 3D warping engine 824 illustrated in FIG. 8. In some examples, the camera pose information can include camera pose information from one or more times, such as time t and time t−1. In some examples, the depth information associated with the input frame can be a depth map, such as the depth map $d_t$ illustrated in FIG. 8. A depth map can include depth information for a plurality of pixels included in the input frame.

At block 1104, the process 1100 includes generating a camera motion compensated frame based on a reference frame and the camera information. For example, the camera motion compensated frame can be generated using 3D warping engine 824 illustrated in FIG. 8. In some aspects, generating the camera motion compensated frame comprises warping the reference frame based on a reconstructed depth map associated with the input frame and the camera information. The camera information used to perform the warping can include camera pose information associated with the input frame and camera pose information associated with the reference frame.

In some examples, the reconstructed depth map can be generated based on a latent representation of a depth map associated with the input frame, wherein the latent representation of the depth map is generated using an autoencoder. For example, the latent representation of the depth map can be generated by the depth map prediction system 822 illustrated in FIG. 8, with the encoder network 825 and decoder network 823 included in an autoencoder.

In some examples, the camera motion compensated frame can be generated based on warping the reference frame using a reconstructed optical flow map associated with the camera information. The reconstructed optical flow map can be generated based on camera motion information that is determined from camera pose information and a depth map associated with the input frame. For example, the camera pose information can include camera pose information associated with the input frame and can include camera pose information associated with the reference frame. In some examples, the reconstructed optical flow map can be generated based on a latent representation of an optical flow map generated using the camera pose information and the depth map.

For example, the latent representation of the optical flow map can be the same as or similar to the latent $z_o$ illustrated in FIG. 8 as being generated using the object motion prediction system 802 and/or the encoder network 805. In some cases, the optical flow information can be generated based on a latent representation of an optical flow associated with the input frame. The optical flow information can include object motion information determined between the input frame and the reference frame using an optical flow autoencoder. For example, the optical flow autoencoder can be implemented using the object motion prediction system 802 and/or the combination of the encoder network 805 and the decoder network 803, each illustrated in FIG. 8.

At block 1106, the process 1100 includes generating optical flow information associated with object motion determined based on at least the input frame and the reference frame. For example, the optical flow information can be generated using object motion prediction system 802 illustrated in FIG. 8 and/or can be generated by one or more of the encoder network 805 and the decoder network 802 also illustrated in FIG. 8. In some cases, the optical flow information can be generated based on a latent representation of an optical flow associated with the input frame. The latent representation of the optical flow can be the same as or similar to the latent representation $z_m$ illustrated in FIG. 8. In some examples, the latent representation of the optical flow associated with the input frame can be generated by an encoder network (e.g., encoder network 805 illustrated in FIG. 8) included in an optical flow encoder network and/or optical flow autoencoder. The latent representation of the optical flow can be received by a decoder network (e.g., decoder network 803 illustrated in FIG. 8) included in an optical flow decoder network and/or an optical flow decoder. The optical flow information can include object motion information determined between the input frame and the reference frame using an optical flow autoencoder.

At block 1108, the process 1100 includes generating a motion compensated frame by warping the camera motion compensated frame based on the optical flow information. For example, the motion compensated frame can be a frame prediction generated by the warping engine 804 illustrated in FIG. 8, based on receiving as input a camera motion compensated frame (e.g., initial frame prediction) from the 3D warping engine 824 and optical flow information from object motion prediction system 802/decoder network 803, each illustrated in FIG. 8. The motion compensated frame can include separate camera motion compensation and object motion compensation and can be used to generate a reconstructed input frame.

At block 1110, the process 1100 includes generating, based on a motion compensated frame and the residual, a reconstructed input frame. For example, the motion compensated frame can be generated as described above with respect to block 1108 and added with a predicted residual generated by a residual prediction system 806 as illustrated in FIG. 8. The residual can be a predicted residual generated by a decoder network 809 of a residual prediction system 806. The predicted residual can be generated by decoder network 809 based on receiving as input a latent representation $z_r$ of the residual, from an encoder network 807, as illustrated in FIG. 8.

Figure 12:
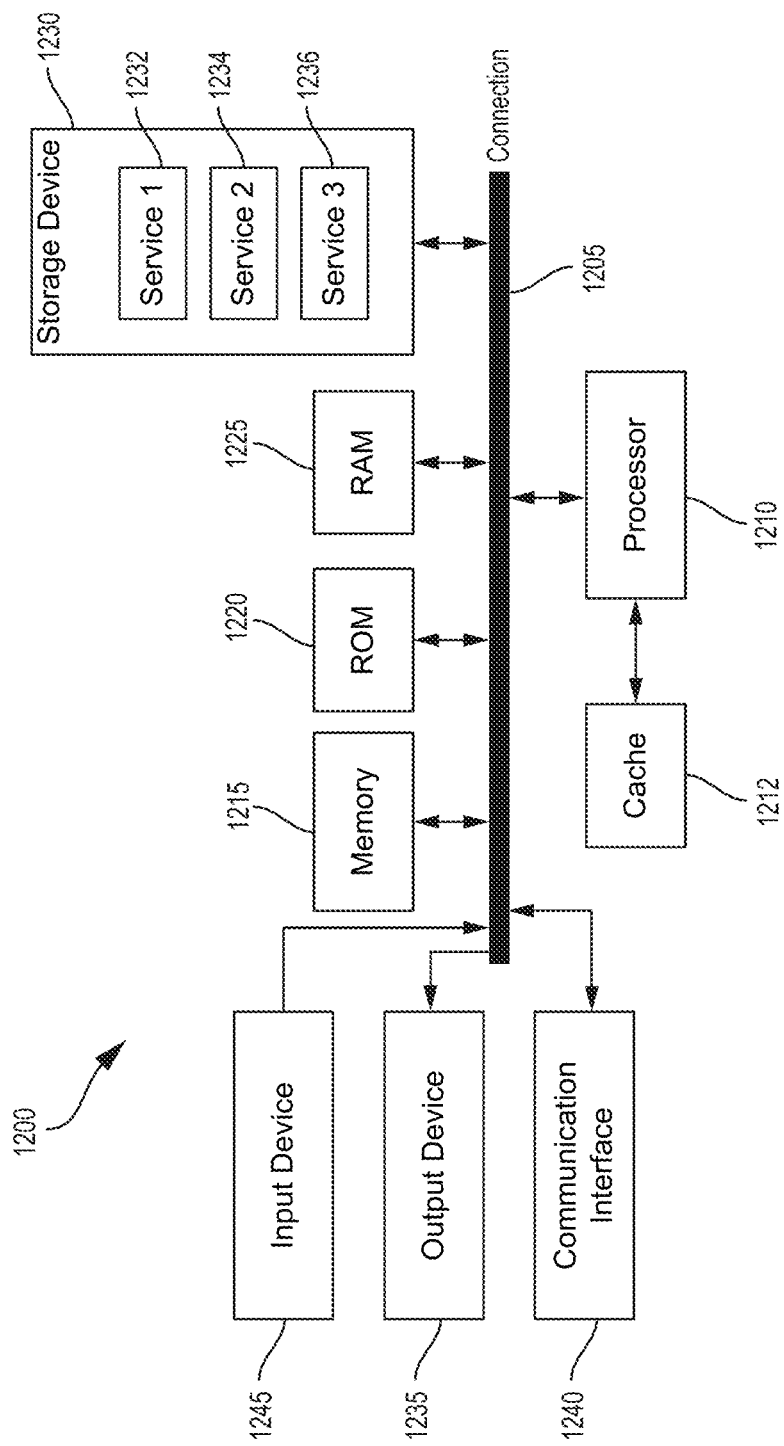
FIG. 12 illustrates an example computing system that can be used to implement various aspects described herein.

In some examples, the processes described herein (e.g., process 1100 and/or other process described herein) may be performed by a computing device or apparatus, such as a computing device having the computing device architecture 1200 shown in FIG. 12. The computing device can include any suitable device, such as an autonomous vehicle computer, a robotic device, a mobile device (e.g., a mobile phone), a desktop computing device, a tablet computing device, a wearable device, a server device, a video game device, an extended reality device (e.g., a virtual reality (VR) device, an augmented reality (AR) device, or a mixed reality (MR) device), a camera device, a set-top box device, and/or any other computing device with the resource capabilities to perform the processes described herein, including process 1100. In some examples, the computing device can include a mobile device, a wearable device, an XR device, a personal computer, a laptop computer, a video server, a television, a camera, a set-top box, a video game console, or other device. In some examples, the process 1100 can be performed by a computing device with the computing device architecture 1200 implementing the machine learning-based video coding system of FIG. 8.

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), application-specific integrated circuits (ASICs), field-programmable gate arrays (FPGAs), and/or other suitable electronic circuits), and/or can include and/or be implemented using computer software, firmware, or any combination thereof, to perform the various operations described herein.

The process 1100 is illustrated as a logical flow diagram, the operations of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 1100) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 12 illustrates an example computing device architecture 1200 of an example computing device which can implement the various techniques described herein. In some examples, the computing device can include a mobile device, a wearable device, an XR device, a personal computer, a laptop computer, a video server, a video game console, a robotic device, a set-top box, a television, a camera, a server, or other device. For example, the computing device architecture 1200 can implement the neural P-frame coding system 800 of FIG. 8. The components of computing device architecture 1200 are shown in electrical communication with each other using connection 1205, such as a bus. The example computing device architecture 1200 includes a processing unit (CPU or processor) 1210 and computing device connection 1205 that couples various computing device components including computing device memory 1215, such as read only memory (ROM) 1220 and random access memory (RAM) 1225, to processor 1210.

Computing device architecture 1200 can include a cache of high-speed memory connected directly with, in close proximity to, or integrated as part of processor 1210. Computing device architecture 1200 can copy data from memory 1215 and/or the storage device 1230 to cache 1212 for quick access by processor 1210. In this way, the cache can provide a performance boost that avoids processor 1210 delays while waiting for data. These and other modules can control or be configured to control processor 1210 to perform various actions. Other computing device memory 1215 may be available for use as well. Memory 1215 can include multiple different types of memory with different performance characteristics. Processor 1210 can include any general purpose processor and a hardware or software service, such as service 1 1232, service 2 1234, and service 3 1236 stored in storage device 1230, configured to control processor 1210 as well as a special-purpose processor where software instructions are incorporated into the processor design. Processor 1210 may be a self-contained system, containing multiple cores or processors, a bus, memory controller, cache, etc. A multi-core processor may be symmetric or asymmetric.

To enable user interaction with the computing device architecture 1200, input device 1245 can represent any number of input mechanisms, such as a microphone for speech, a touch-sensitive screen for gesture or graphical input, keyboard, mouse, motion input, speech and so forth. Output device 1235 can also be one or more of a number of output mechanisms known to those of skill in the art, such as a display, projector, television, speaker device, etc. In some instances, multimodal computing devices can enable a user to provide multiple types of input to communicate with computing device architecture 1200. Communication interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. Storage device 1230 can include services 1232, 1234, 1236 for controlling processor 1210. Other hardware or software modules are contemplated. Storage device 1230 can be connected to the computing device connection 1205. In one aspect, a hardware module that performs a particular function can include the software component stored in a computer-readable medium in connection with the necessary hardware components, such as processor 1210, connection 1205, output device 1235, and so forth, to carry out the function.

The term "device" is not limited to one or a specific number of physical objects (such as one smartphone, one controller, one processing system, and so on). As used herein, a device can include any electronic device with one or more parts that may implement at least some portions of this disclosure. While the description and examples use the term "device" to describe various aspects of this disclosure, the term "device" is not limited to a specific configuration, type, or number of objects. Additionally, the term "system" is not limited to multiple components or specific examples. For example, a system may be implemented on one or more printed circuit boards or other substrates, and may have movable or static components. While the description and examples use the term "system" to describe various aspects of this disclosure, the term "system" is not limited to a specific configuration, type, or number of objects.

Specific details are provided in the description to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the examples.

Individual aspects and/or examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein can also be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects of the present disclosure can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: An apparatus for decoding video data, the apparatus comprising: at least one memory; and at least one processor coupled to the at least one memory, the at least one processor configured to: obtain a frame of encoded video data associated with an input frame, the frame of encoded video data including camera information associated with generating the video data and a residual; generate a camera motion compensated frame based on a reference frame and the camera information; generate optical flow information associated with object motion determined based on at least the input frame and the reference frame; generate a motion compensated frame by warping the camera motion compensated frame based on the optical flow information; and generate, based on the motion compensated frame and the residual, a reconstructed input frame.

Aspect 2: The apparatus of Aspect 1, wherein the camera information includes one or more of a camera projection matrix, a camera pose information associated with the input frame, and a depth information associated with the input frame.

Aspect 3: The apparatus of Aspect 2, wherein the depth information associated with the input frame is a depth map including depth information for a plurality of pixels included in the input frame.

Aspect 4: The apparatus of any of Aspects 1 to 3, wherein to generate the camera motion compensated frame, the at least one processor is configured to: warp the reference frame based on a reconstructed depth map associated with the input frame and the camera information; wherein the camera information includes camera pose information associated with the input frame, and camera pose information associated with the reference frame.

Aspect 5: The apparatus of Aspect 4, wherein the at least one processor is further configured to generate the reconstructed depth map based on a latent representation of a depth map associated with the input frame, wherein the latent representation of the depth map is generated using an autoencoder.

Aspect 6: The apparatus of any of Aspects 4 to 5, wherein: the optical flow information is generated based on a latent representation of an optical flow associated with the input frame; and the optical flow information includes object motion information determined between the input frame and the reference frame using an optical flow autoencoder.

Aspect 7: The apparatus of any of Aspects 1 to 6, wherein to generate the camera motion compensated frame, the at least one processor is configured to: warp the reference frame based on a reconstructed optical flow map associated with the camera information; wherein the reconstructed optical flow map is generated based on camera motion information determined using camera pose information and a depth map associated with the input frame.

Aspect 8: The apparatus of Aspect 7, wherein the camera pose information includes camera pose information associated with the input frame and camera pose information associated with the reference frame.

Aspect 9: The apparatus of Aspect 8, wherein the at least one processor is further configured to generate the reconstructed optical flow map based on a latent representation of an optical map generated using the camera pose information and the depth map.

Aspect 10: The apparatus of any of Aspects 7 to 9, wherein: the optical flow information is generated based on a latent representation of an optical flow associated with the input frame; and the optical flow information includes object motion information determined between the input frame and the reference frame using an optical flow autoencoder.

Aspect 11: A method for decoding video data, the method comprising: obtaining a frame of encoded video data associated with an input frame, the frame of encoded video data including camera information associated with generating the video data and a residual; generating a camera motion compensated frame based on a reference frame and the camera information; generating optical flow information associated with object motion determined based on at least the input frame and the reference frame; generating a motion compensated frame by warping the camera motion compensated frame based on the optical flow information; and generating, based on the motion compensated frame and the residual, a reconstructed input frame.

Aspect 12: The method of Aspect 11, wherein the camera information includes one or more of a camera projection matrix, a camera pose information associated with the input frame, and a depth information associated with the input frame.

Aspect 13: The method of Aspect 12, wherein the depth information associated with the input frame is a depth map including depth information for a plurality of pixels included in the input frame.

Aspect 14: The method of any of Aspects 11 to 13, wherein generating the camera motion compensated frame comprises warping the reference frame based on a reconstructed depth map associated with the input frame and the camera information, wherein the camera information includes camera pose information associated with the input frame, and camera pose information associated with the reference frame.

Aspect 15: The method of Aspect 14, further comprising generating the reconstructed depth map based on a latent representation of a depth map associated with the input frame, wherein the latent representation of the depth map is generated using an autoencoder.

Aspect 16: The method of any of Aspects 14 to 15, wherein: the optical flow information is generated based on a latent representation of an optical flow associated with the input frame; and the optical flow information includes object motion information determined between the input frame and the reference frame using an optical flow autoencoder.

Aspect 17: The method of any of Aspects 11 to 16, wherein generating the camera motion compensated frame comprises warping the reference frame based on a reconstructed optical flow map associated with the camera information, wherein the reconstructed optical flow map is generated based on camera motion information determined using camera pose information and a depth map associated with the input frame.

Aspect 18: The method of Aspect 17, wherein the camera pose information includes camera pose information associated with the input frame and camera pose information associated with the reference frame.

Aspect 19: The method of Aspect 18, further comprising generating the reconstructed optical flow map based on a latent representation of an optical map generated using the camera pose information and the depth map.

Aspect 20: The method of any of Aspects 17 to 19, wherein: the optical flow information is generated based on a latent representation of an optical flow associated with the input frame; and the optical flow information includes object motion information determined between the input frame and the reference frame using an optical flow autoencoder.

Aspect 21: An apparatus for encoding video data, the apparatus comprising: at least one memory; and at least one processor coupled to the at least one memory, the at least one processor configured to: obtain an input frame of video data and camera information associated with generating the input frame of video data; generate a camera motion compensated frame based on a reference frame and the camera information; generate optical flow information associated with object motion determined based on at least the input frame and the reference frame; generate a motion compensated frame by warping the camera motion compensated frame based on the optical flow information; determine, based on a difference between the input frame and a reconstructed input frame generated using the motion compensated frame, a residual; and generate a frame of encoded video data associated with the input frame of video data, the frame of encoded video data including the camera information and the residual.

Aspect 22: The apparatus of Aspect 21, wherein the camera information includes one or more of a camera projection matrix, a camera pose information associated with the input frame, and a depth information associated with the input frame.

Aspect 23: The apparatus of Aspect 22, wherein the depth information associated with the input frame is a depth map including depth information for a plurality of pixels included in the input frame.

Aspect 24: The apparatus of any of Aspects 21 to 23, wherein to generate the camera motion compensated frame, the at least one processor is configured to: warp the reference frame based on a reconstructed depth map associated with the input frame and the camera information; wherein the camera information includes camera pose information associated with the input frame, and camera pose information associated with the reference frame.

Aspect 25: The apparatus of Aspect 24, wherein the at least one processor is further configured to generate the reconstructed depth map based on a latent representation of a depth map associated with the input frame, wherein the latent representation of the depth map is generated using an autoencoder.

Aspect 26: The apparatus of any of Aspects 24 to 25, wherein: the optical flow information is generated based on a latent representation of an optical flow associated with the input frame; and the optical flow information includes object motion information determined between the input frame and the reference frame using an optical flow autoencoder.

Aspect 27: The apparatus of any of Aspects 21 to 26, wherein to generate the camera motion compensated frame, the at least one processor is configured to: warp the reference frame based on a reconstructed optical flow map associated with the camera information; wherein the reconstructed optical flow map is generated based on camera motion information determined using camera pose information and a depth map associated with the input frame.

Aspect 28: The apparatus of Aspect 27, wherein the at least one processor is further configured to generate the reconstructed optical flow map based on a latent representation of an optical map generated using the camera pose information and the depth map.

Aspect 29: The apparatus of any of Aspects 27 to 28, wherein: the optical flow information is generated based on a latent representation of an optical flow associated with the input frame; and the optical flow information includes object motion information determined between the input frame and the reference frame using an optical flow autoencoder.

Aspect 30: A method for encoding video data, the method comprising: obtaining an input frame of video data and camera information associated with generating the input frame of video data; generating a camera motion compensated frame based on a reference frame and the camera information; generating optical flow information associated with object motion determined based on at least the input frame and the reference frame; generating a motion compensated frame by warping the camera motion compensated frame based on the optical flow information; determining, based on a difference between the input frame and a reconstructed input frame generated using the motion compensated frame, a residual; and generating a frame of encoded video data associated with the input frame of video data, the frame of encoded video data including the camera information and the residual.

Aspect 31: A non-transitory computer-readable storage medium having stored thereon instructions which, when executed by one or more processors, cause the one or more processors to perform any of the operations of Aspects 1 to 20.

Aspect 32: A non-transitory computer-readable storage medium having stored thereon instructions which, when executed by one or more processors, cause the one or more processors to perform any of the operations of Aspects 21 to 30.

Aspect 33: An apparatus comprising means for performing any of the operations of Aspects 1 to 20.

Aspect 34: An apparatus comprising means for performing any of the operations of Aspects 21 to 30.

What is claimed is:

1. An apparatus for decoding video data, the apparatus comprising:
at least one memory; and
at least one processor coupled to the at least one memory, the at least one processor configured to:
obtain a frame of encoded video data associated with an input frame, the frame of encoded video data including camera information associated with generating the video data and a residual, wherein the camera information includes camera pose information associated with the input frame;

warp a reference frame using the camera information to generate a camera motion compensated frame;
generate optical flow information associated with object motion determined based on at least the input frame and the reference frame;
warp the camera motion compensated frame using the optical flow information to generate a motion compensated frame; and
generate, based on the motion compensated frame and the residual, a reconstructed input frame.

2. The apparatus of claim 1, wherein the camera information further includes at least one of a camera projection matrix or depth information associated with the input frame.

3. The apparatus of claim 2, wherein the depth information associated with the input frame is a depth map including depth information for a plurality of pixels included in the input frame.

4. The apparatus of claim 1, wherein the at least one processor is configured to:
warp the reference frame based on a reconstructed depth map associated with the input frame and the camera information;
wherein the camera information further includes camera pose information associated with the reference frame.

5. The apparatus of claim 4, wherein the at least one processor is further configured to generate the reconstructed depth map based on a latent representation of a depth map associated with the input frame, wherein the latent representation of the depth map is generated using an autoencoder.

6. The apparatus of claim 4, wherein:
the optical flow information is generated based on a latent representation of an optical flow associated with the input frame; and
the optical flow information includes object motion information determined between the input frame and the reference frame using an optical flow autoencoder.

7. The apparatus of claim 1, wherein the at least one processor is configured to:
warp the reference frame based on a reconstructed optical flow map associated with the camera information;
wherein the reconstructed optical flow map is generated based on camera motion information determined using the camera pose information and a depth map associated with the input frame.

8. The apparatus of claim 7, wherein the camera pose information further includes camera pose information associated with the reference frame.

9. The apparatus of claim 8, wherein the at least one processor is further configured to generate the reconstructed optical flow map based on a latent representation of an optical flow map generated using the camera pose information and the depth map.

10. The apparatus of claim 7, wherein:
the optical flow information is generated based on a latent representation of an optical flow associated with the input frame; and
the optical flow information includes object motion information determined between the input frame and the reference frame using an optical flow autoencoder.

11. A method for decoding video data, the method comprising:
obtaining a frame of encoded video data associated with an input frame, the frame of encoded video data including camera information associated with generating the video data and a residual, wherein the camera information includes camera pose information associated with the input frame;
warping a reference frame using the camera information to generate a camera motion compensated frame;
generating optical flow information associated with object motion determined based on at least the input frame and the reference frame;
warp the camera motion compensated frame using the optical flow information to generate a motion compensated frame; and
generating, based on the motion compensated frame and the residual, a reconstructed input frame.

12. The method of claim 11, wherein the camera information further includes at least one of a camera projection matrix or depth information associated with the input frame.

13. The method of claim 12, wherein the depth information associated with the input frame is a depth map including depth information for a plurality of pixels included in the input frame.

14. The method of claim 11, wherein the reference frame is warped based on a reconstructed depth map associated with the input frame and the camera information, and wherein the camera information further includes camera pose information associated with the reference frame.

15. The method of claim 14, further comprising generating the reconstructed depth map based on a latent representation of a depth map associated with the input frame, wherein the latent representation of the depth map is generated using an autoencoder.

16. The method of claim 14, wherein:
the optical flow information is generated based on a latent representation of an optical flow associated with the input frame; and
the optical flow information includes object motion information determined between the input frame and the reference frame using an optical flow autoencoder.

17. The method of claim 11, wherein the reference frame is warped based on a reconstructed optical flow map associated with the camera information, wherein the reconstructed optical flow map is generated based on camera motion information determined using the camera pose information and a depth map associated with the input frame.

18. The method of claim 17, wherein the camera pose information further includes camera pose information associated with the reference frame.

19. The method of claim 18, further comprising generating the reconstructed optical flow map based on a latent representation of an optical flow map generated using the camera pose information and the depth map.

20. The method of claim 17, wherein:
the optical flow information is generated based on a latent representation of an optical flow associated with the input frame; and
the optical flow information includes object motion information determined between the input frame and the reference frame using an optical flow autoencoder.

21. An apparatus for encoding video data, the apparatus comprising:
at least one memory; and
at least one processor coupled to the at least one memory, the at least one processor configured to:
obtain an input frame of video data and camera information associated with generating the input frame of video data, wherein the camera information includes camera pose information associated with the input frame;

warp a reference frame using the camera information to generate a camera motion compensated frame;

generate optical flow information associated with object motion determined based on at least the input frame and the reference frame;

warp the camera motion compensated frame using the optical flow information to generate a motion compensated frame;

determine, based on a difference between the input frame and a reconstructed input frame generated using the motion compensated frame, a residual; and generate a frame of encoded video data associated with the input frame of video data, the frame of encoded video data including the camera information and the residual.

22. The apparatus of claim 21, wherein the camera information further includes at least one of a camera projection matrix or depth information associated with the input frame.

23. The apparatus of claim 22, wherein the depth information associated with the input frame is a depth map including depth information for a plurality of pixels included in the input frame.

24. The apparatus of claim 21, wherein the at least one processor is configured to:

warp the reference frame based on a reconstructed depth map associated with the input frame and the camera information;

wherein the camera information further includes camera pose information associated with the reference frame.

25. The apparatus of claim 24, wherein the at least one processor is further configured to generate the reconstructed depth map based on a latent representation of a depth map associated with the input frame, wherein the latent representation of the depth map is generated using an autoencoder.

26. The apparatus of claim 24, wherein:

the optical flow information is generated based on a latent representation of an optical flow associated with the input frame; and the optical flow information includes object motion information determined between the input frame and the reference frame using an optical flow autoencoder.

27. The apparatus of claim 21, wherein the at least one processor is configured to:

warp the reference frame based on a reconstructed optical flow map associated with the camera information;

wherein the reconstructed optical flow map is generated based on camera motion information determined using the camera pose information and a depth map associated with the input frame.

28. The apparatus of claim 27, wherein the at least one processor is further configured to generate the reconstructed optical flow map based on a latent representation of an optical flow map generated using the camera pose information and the depth map.

29. The apparatus of claim 27, wherein:

the optical flow information is generated based on a latent representation of an optical flow associated with the input frame; and the optical flow information includes object motion information determined between the input frame and the reference frame using an optical flow autoencoder.

30. A method for encoding video data, the method comprising:

obtaining an input frame of video data and camera information associated with generating the input frame of video data, wherein the camera information includes camera pose information associated with the input frame;

warping a reference frame using the camera information to generate a camera motion compensated frame;

generating optical flow information associated with object motion determined based on at least the input frame and the reference frame;

warping the camera motion compensated frame using the optical flow information to generate a motion compensated frame;

determining, based on a difference between the input frame and a reconstructed input frame generated using the motion compensated frame, a residual; and generating a frame of encoded video data associated with the input frame of video data, the frame of encoded video data including the camera information and the residual.

* * * * *